United States Patent
Ichieda

(10) Patent No.: US 11,109,007 B2
(45) Date of Patent: Aug. 31, 2021

(54) METHOD FOR CONTROLLING PROJECTOR, PROJECTOR, AND PROJECTION SYSTEM

(71) Applicant: SEIKO EPSON CORPORATION, Tokyo (JP)

(72) Inventor: Hiroyuki Ichieda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/741,836

(22) Filed: Jan. 14, 2020

(65) Prior Publication Data

US 2020/0228767 A1 Jul. 16, 2020

(30) Foreign Application Priority Data

Jan. 15, 2019 (JP) .............................. JP2019-004084

(51) Int. Cl.
*H04N 9/31* (2006.01)

(52) U.S. Cl.
CPC ......... *H04N 9/3185* (2013.01); *H04N 9/3188* (2013.01); *H04N 9/3194* (2013.01)

(58) Field of Classification Search
CPC ... H04N 9/3185; H04N 9/3188; H04N 9/3194
USPC ........................................ 348/745, 744, 806
See application file for complete search history.

(56) References Cited

U.S. PATENT DOCUMENTS

| 2014/0145948 A1 | 5/2014 | Hong et al. |
| 2015/0208050 A1* | 7/2015 | Pawlak ................ H04N 9/3185 |
| | | 348/189 |
| 2020/0077059 A1* | 3/2020 | Senshiki ................ G06T 7/70 |

FOREIGN PATENT DOCUMENTS

| JP | 2006-243149 A | 9/2006 |
| JP | 2015-159524 A | 9/2015 |
| JP | 2018-085553 A | 5/2018 |
| JP | 2018-160803 A | 10/2018 |

* cited by examiner

*Primary Examiner* — Trang U Tran
(74) *Attorney, Agent, or Firm* — Dority & Manning, P.A.

(57) ABSTRACT

A method for controlling a projector includes projecting a projection image representing a first mark and a second mark on a projection surface, generating captured image data representing a captured image by causing the imaging section to capture an image of the projection image displayed on the projection surface, and detecting the position of the first mark and the position of the second mark based on the captured image data. The first mark and the second mark are so located in the captured image that a first distance between the first mark displayed on the projection surface and the imaging section is longer than a second distance between the second mark displayed on the projection surface and the imaging section. The size of the first mark is greater than the size of the second mark in the captured image.

13 Claims, 12 Drawing Sheets

METHOD FOR CONTROLLING PROJECTOR, PROJECTOR, AND PROJECTION SYSTEM

The present application is based on, and claims priority from JP Application Serial Number 2019-004084, filed Jan. 15, 2019, the disclosure of which is hereby incorporated by reference herein in its entirety.

BACKGROUND

1. Technical Field

The present disclosure relates to a method for controlling a projector, a projector, and a projection system.

2. Related Art

JP-A-2018-160803 describes a projector that generates captured image data representing a captured image by causing an imaging section to capture an image of a plurality of dots having the same size and located on a projection surface and detects the positions of the plurality of dots based on the captured image data.

A longer distance from the imaging section to marks, such as dots, located on the projection surface causes the marks to each have a smaller size in a captured image. A plurality of dots located on the projection surface and having the same size in an image captured by the projector described in JP-A-2018-160803 therefore each have a size that varies in accordance with the distance from the imaging section. A larger difference in the size of the dots displayed in the captured image requires a more complicated process of detecting the positions of the plurality of dots based on the captured image data. The projector described in JP-A-2018-160803 therefore requires a complicated position detection process.

SUMMARY

A method for controlling a projector according to an aspect of the present disclosure is a method for controlling a projector including an imaging section, the method including projecting a projection image representing a first mark and a second mark on a projection surface, generating captured image data representing a captured image by causing the imaging section to capture an image of the projection image projected on the projection surface, and detecting a position of the first mark and a position of the second mark based on the captured image data. A first distance between the first mark projected on the projection surface and the imaging section is longer than a second distance between the second mark projected on the projection surface and the imaging section, and a size of the first mark is greater than a size of the second mark.

A projector according to another aspect of the present disclosure includes a projection section that projects a projection image representing a first mark and a second mark on a projection surface, an imaging section that generates captured image data representing a captured image by capturing an image of the projection image projected on the projection surface, and a first detector that detects a position of the first mark and a position of the second mark based on the captured image data. A first distance between the first mark projected on the projection surface and the imaging section is longer than a second distance between the second mark projected on the projection surface and the imaging section, and a size of the first mark is greater than a size of the second mark.

A projection system according to another aspect of the present disclosure includes a projector that projects a first object placed on a projection surface, a second object placed on the projection surface, and a projection image on the projection surface. The first object and the second object specify an area of the projection surface that is an area where the projection image should be projected. The projector includes an imaging section that generates captured image data representing a captured image by capturing an image of the first object and the second object placed on the projection surface and a second detector that detects a position of the first object and a position of the second object based on the captured image data. A distance between the imaging section and the first object is longer than a distance between the imaging section and the second object. A size of the first object is greater than a size of the second object.

DESCRIPTION OF EXEMPLARY EMBODIMENTS

A. First Embodiment

A1. Outline

Figure 1:
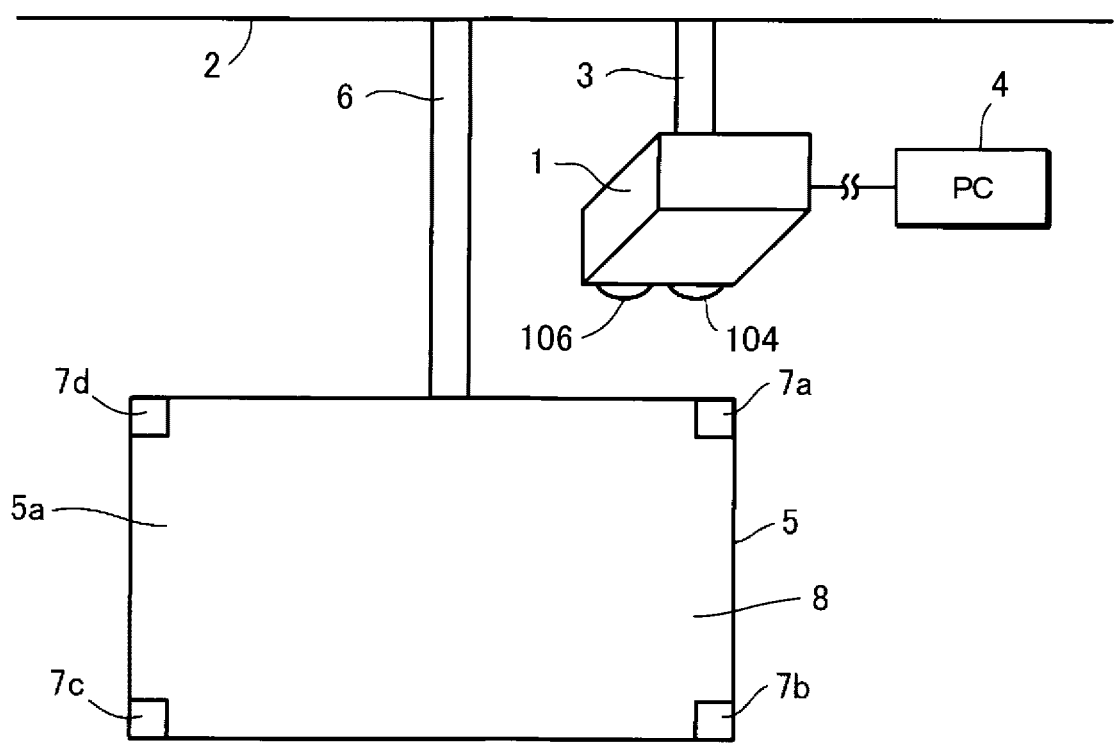
FIG. 1 shows a projector according to a first embodiment.

FIG. 1 shows a projector 1 according to a first embodiment. The projector 1 is what is called an ultra-short focal length projector having a throw ratio smaller than or equal to 0.38, for example, a throw ratio smaller than or equal to 0.28. The projector 1 is supported by a first support apparatus 3 installed on a ceiling 2. The first support apparatus 3 may be installed on a wall or any other surface instead of the ceiling 2.

The projector 1 is coupled to a personal computer (PC) 4, for example, via a wired LAN (local area network) or wireless LAN. The coupling between the projector 1 and the PC 4 is not limited to wired LAN or wireless LAN and is changeable as appropriate. For example, the projector 1 may be coupled to the PC 4 via a USB (universal serial bus) cable, an HDMI (high definition multimedia interface) cable, or a VGA (video graphics array) cable. USB is a registered trademark. HDMI is a registered trademark.

The projector 1 receives image date from the PC 4. The PC 4 can be referred to as an image data provider. The image data provider is not limited to the PC 4 and is changeable as appropriate. For example, the image data provider may be a DVD (digital versatile disc) player. DVD is a registered trademark. The projector 1 may receive image data by reading the image data from a recording medium, such as a USB memory. The image data received by the projector 1 represents, for example, advertisement. The image data received by the projector 1 may instead represent information different from advertisement, for example, documentation for presentation.

The projector 1 projects an image generated by liquid crystal light valves 12, which will be described later, specifically, an image indicated by the image data, and the projector 1 projects the image from a projection section 104 toward a projection surface 5a located obliquely below the projector 1. That is, the projector 1 projects the image indicated by the image data on the projection surface 5a in a projection direction inclining with respect to a normal to the projection surface 5a.

The image generated by the liquid crystal light valves 12 is hereinafter referred to as a "generation image." An image displayed on the projection surface 5a when the projector 1 projects a generation image toward the projection surface 5a is hereinafter referred to as a "projection image." The generation image can be a distorted generation image having distortion based, for example, on the positional relationship between the projector 1 and the projection surface 5a.

The projector 1 can perform trapezoidal distortion correction for correcting the distortion of the generation image.

The color of the projection surface 5a is, for example, white. The color of the projection surface 5a is not limited to white. To make the generation image to be readily viewable, however, the color of the projection surface 5a is desirably a color close to white, for example, pale gray or cream. The projection surface 5a is a surface of a projection board 5. The projection surface 5a is not limited to a surface of the projection board 5 and is changeable as appropriate. The projection surface 5a may, for example, be a screen, a wall, a blackboard, a whiteboard, or a door. The projection board 5 is supported by a second support apparatus 6, which is installed on the ceiling 2. The second support apparatus 6 may be installed on a wall or any other surface instead of the ceiling 2.

A first object 7a, a second object 7b, a third object 7c, and a fourth object 7d are placed on the projection surface 5a. The first object 7a, the second object 7b, the third object 7c, and the fourth object 7d have the same size. The first object 7a, the second object 7b, the third object 7c, and the fourth object 7d do not necessarily have the same size, as will be described later.

In a case where the first object 7a, the second object 7b, the third object 7c, and the fourth object 7d do not need to be distinguished from one another, the first object 7a, the second object 7b, the third object 7c, and the fourth object 7d are hereinafter each referred to as an "object 7."

The objects 7 determine a projection area 8, where a projection image should be projected, on the projection surface 5a. The projection area 8 has a quadrangular shape. The four corners of the projection area 8 is specified based on the positions of the four objects 7. In the present embodiment, the positions of the four objects 7 form the four corners of the projection area 8. In FIG. 1, the four objects 7 are placed at the four corners of the projection surface 5a. The entire projection surface 5a therefore forms the projection area 8 in FIG. 1.

The objects 7 are each a recursive reflection member. The objects 7 therefore reflect light incident thereon in the direction opposite the direction in which the light is incident. The optical reflection characteristic of the objects 7 differ from the optical reflection characteristic of the projection surface 5a. The difference in the reflection characteristic produces a difference in brightness between the objects 7 and the projection surface 5a. The difference in brightness can be used to detect the objects 7. The objects 7 may instead each be an object including a light emitter that emits visible light or nonvisible light. An example of the nonvisible light may be infrared light.

In place of the configuration in which the difference in brightness between the objects 7 and the projection surface 5a is used to detect the objects 7, a configuration in which a difference in tint between the objects 7 and the projection surface 5a is used to detect the objects 7 may be employed. The projector 1 and the objects 7 are components that form a projection system.

The projector 1 causes an imaging section 106 provided in the projector 1 to capture an image of the projection surface 5a to generate captured image data representing a captured image and detects the objects 7 based on the captured image data. The projector 1 captures an image of the projection surface 5a in an imaging direction inclining with respect to a normal to the projection surface 5a. The imaging direction substantially coincides with the projection direction. FIG. 1 shows an example in which the projection section 104 and the imaging section 106 are disposed in the same plane of the projector 1 in such a way that the imaging direction and the projection direction substantially coincide with each other. The imaging section 106 is so disposed as to be capable of capturing an image of an area wider than the projection surface 5a. Depending on the position or size of the projection surface 5a, the imaging section 106 may not be disposed in the same plane of the projector 1 where the projection section 104 is disposed.

For example, in a case the projector 1 projects a projection image on the projection area 8, part of the projection image is incident on the objects 7. The light reflected off the objects 7, which are each a recursive reflection member, travels toward the projector 1, which is the source that projects the projection image, and enters the imaging section 106 of the projector 1. On the other hand, the light reflected off the projection surface 5a is scattered. Instead, the light incident on the projection surface 5a is absorbed by the projection surface 5a. A difference in brightness between the objects 7 and the projection surface 5a therefore occurs in the captured image indicated by the captured image data. The projector 1 detects the difference in brightness between the objects 7 and the projection surface 5a based on the captured image data and detects the objects 7 based on the difference in brightness.

A2. Configuration

Figure 2:
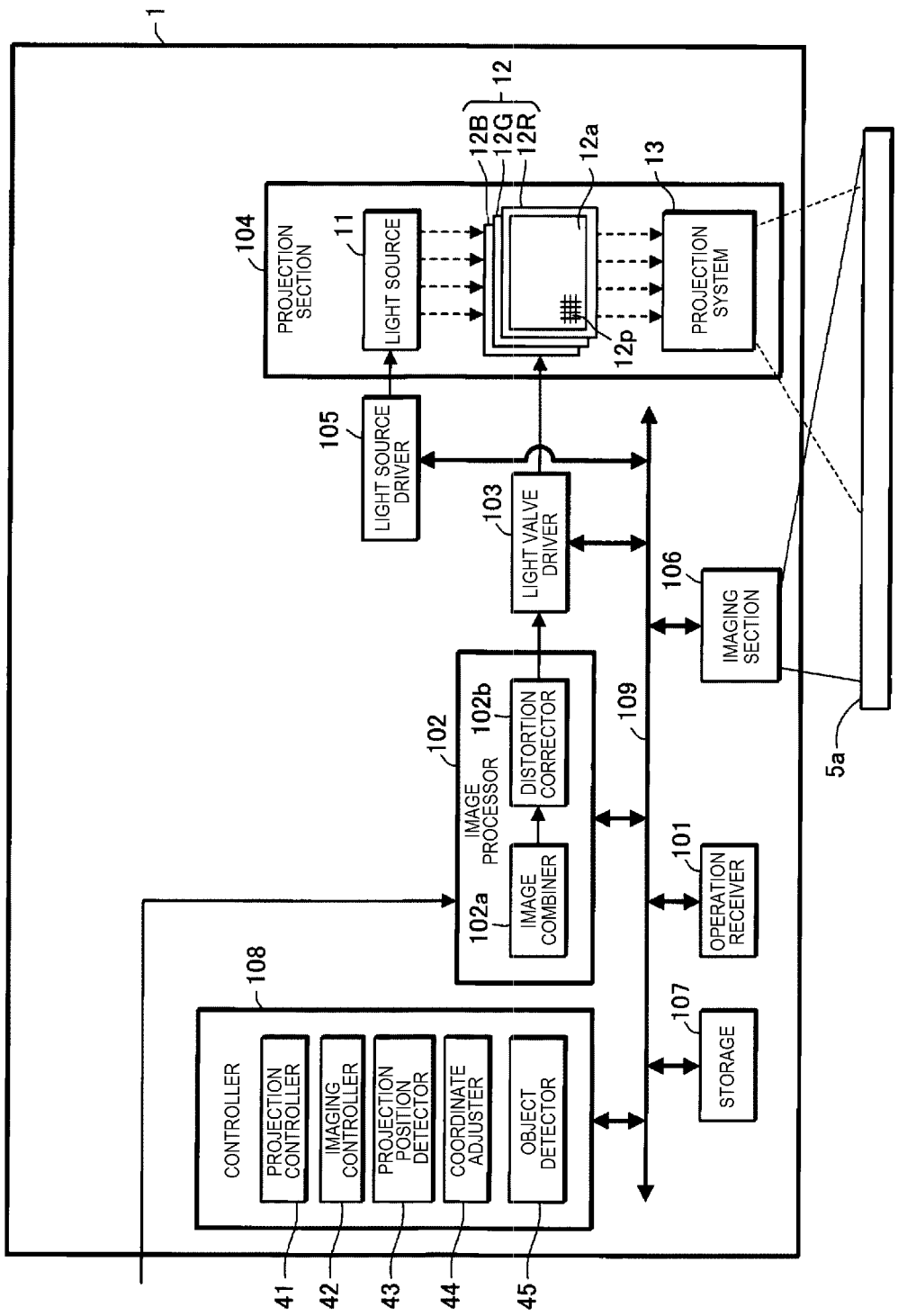
FIG. 2 diagrammatically shows the projector.

FIG. 2 diagrammatically shows the projector 1. The projector 1 includes an operation receiver 101, an image processor 102, a light valve driver 103, the projection section 104, a light source driver 105, the imaging section 106, a storage 107, a controller 108, and a bus 109. The image processor 102 includes an image combiner 102a and a distortion corrector 102b. The projection section 104 includes a light source 11, a liquid crystal light valve 12R for red, a liquid crystal light valve 12G for green, a liquid crystal light valve 12B for blue, and a projection system 13.

In a case where the liquid crystal light valve 12R for red, the liquid crystal light valve 12G for green, and the liquid crystal light valve 12B for blue do not need to be distinguished from one another, the liquid crystal light valve 12R for red, the liquid crystal light valve 12G for green, and the liquid crystal light valve 12B for blue are each simply referred to a "liquid crystal light valve 12."

The operation receiver 101 is formed, for example, of a variety of operation buttons or operation keys or a touch panel. The operation receiver 101 receives a user's input operation. The operation receiver 101 may be a remote control that transmits information based on the input operation in a wireless or wired manner. In this case, the projector 1 includes a receiver that receives information from the remote control. The remote control includes a variety of operation buttons or operation keys or a touch panel that receives the input operation. The operation receiver 101 may wirelessly accept an input of operation performed on an application program that runs on an information terminal apparatus, such as a smartphone, from the information terminal apparatus.

The image processor 102 performs image processing on image data to generate an image signal. For example, the image processor 102 performs image processing on the image data received, for example, from the PC 4 to generate an image signal. Image data received by the image processor 102 from another instrument is hereinafter referred to as "received image data."

The image combiner 102a combines a plurality of image data sets with one another and outputs single image data. For example, the image combiner 102a outputs received image data, guide image data, image data for projection position detection, and image data for object detection.

The guide image data represents a guide image I1, which guides installation of the projector 1. An example of the guide image I1 will be described later with reference to FIG. 4.

The image data for projection position detection represents a projection position detection pattern I2 representing dots I2a to I2d, which are position detection targets. An example of the projection position detection pattern I2 will be described later with reference to FIG. 5.

The projection position detection pattern I2 is used to perform calibration that relates a camera coordinate system to a liquid crystal panel coordinate system. The camera coordinate system is a coordinate system applied to the imaging section 106, in more detail, a coordinate system applied to a captured image indicated by the captured image data produced by the imaging section 106. The liquid crystal panel coordinate system is a coordinate system applied to the liquid crystal light valves 12. In the calibration, a projection conversion matrix that relates the camera coordinate system to the liquid crystal panel coordinate system is generated.

The image data for object detection represents an object detection pattern I3 for detecting the positions of the objects 7. An example of the object detection pattern I3 will be described later with reference to FIG. 6.

The received image data, the guide image data, the image data for projection position detection, and the image data for object detection are, of course, each image data.

The distortion corrector 102b performs trapezoidal distortion correction on the image data outputted by the image combiner 102a to generate an image signal.

The trapezoidal distortion correction performed by the distortion corrector 102b is the process of generating a generation image only in an area of each of the liquid crystal light valves 12 that is the area corresponding to the projection area 8 in such a way that a projection image is projected only in the projection area 8 of the projection surface 5a. Specifically, the distortion corrector 102b generates the image signal by performing the trapezoidal distortion correction on the image data outputted by the image combiner 102a in such a way that an image indicated by the image data is generated only in an area of each of the liquid crystal light valves 12 that is the area corresponding to the projection area 8.

The light valve driver 103 drives the liquid crystal light valves 12, specifically, the liquid crystal light valve 12R for red, the liquid crystal light valve 12G for green, and the liquid crystal light valve 12B for blue based on the image signal.

The projection section 104 projects a projection image corresponding to the generation image on the projection surface 5a. For example, the projection section 104 projects a projection image on the projection surface 5a on which the objects 7 are placed.

The light source 11 is, for example, a xenon lamp, an ultrahigh-pressure mercury lamp, an LED (light emitting diode), or a laser light source. The light outputted from the light source 11 passes through an optical integration system that is not shown, which reduces variation in the luminance distribution of the light, and is then separated by a color separating system that is not shown into color light components formed of red, green, and blue light components, which are the three primary colors of light. In the following description, red is referred to as "R", green is referred to as "G", and blue is referred to as "B". The color light component R is incident on the liquid crystal light valve 12R for red. The color light component G is incident on the liquid crystal light valve 12G for green. The color light component B is incident on the liquid crystal light valve 12B for blue.

The liquid crystal light valves 12 are each formed, for example, of a liquid crystal panel formed of a liquid crystal material present between a pair of transparent substrates. The liquid crystal light valves 12 each have a rectangular pixel area 12a formed of a plurality of pixels 12p arranged in a matrix. The liquid crystal light valves 12 can apply drive voltage to the liquid crystal material for each of the pixels 12p. When the light valve driver 103 applies drive voltage based on the image signal inputted from the image processor 102 to each of the pixels 12p, the optical transmittance of the pixel 12p is set based on the image signal. The light outputted from the light source 11 is therefore modulated when passing through the image area 12a of each of the liquid crystal light valves, whereby an image based on the image signal is formed on a color light basis.

The color images are combined with one another by a light combining system that is not shown for each of the pixels 12p into a color image. The image is enlarged by the projection system 13, and a projection image is projected on the projection surface 5a.

The light source driver 105 drives the light source 11. For example, the light source driver 105 causes the light source 11 to emit light when the operation receiver 101 receives an input of operation of powering on the projector 1.

The imaging section 106 is, for example, a camera. The imaging section 106 generates captured image data representing a captured image by capturing an image of a projection image projected on the projection surface 5a. The imaging section 106 includes an optical system, such as a lens, and an imaging device that converts light collected by the optical system into an electric signal. The imaging device is, for example, a CCD (charge coupled device) image sensor or a CMOS (complementary metal oxide semiconductor) image sensor. The imaging section 106 generates time-series captured image data by repeatedly capturing an image of the projection image projected on the projection surface 5a.

In a case where the imaging section 106 is built in the projector 1, which is an ultrashort focal length projector, the imaging direction of the imaging section 106 is caused to incline with respect to a normal to the projection surface 5a or a fisheye lens is used so that an image of the projection range is reliably captured.

The storage 107 is a computer-readable recording medium. The storage 107 stores a program that specifies the action of the projector 1 and a variety of pieces of information.

The controller 108 is a computer, such as a CPU (central processing unit). The controller 108 may be formed of one or more processors. The controller 108 reads and executes the program stored in the storage 107 to achieve a projection controller 41, an imaging controller 42, a projection position detector 43, a coordinate adjuster 44, and an object detector 45.

The projection controller 41 controls the image processor 102 and the light source driver 105 to control a projection image projected by the projection section 104. The projection controller 41 causes the projection section 104 to project, for example, the guide image I1, the projection position detection pattern I2, and the object detection pattern I3.

The imaging controller 42 controls the imaging section 106 to cause the imaging section 106 to generate captured image data.

For example, the imaging controller 42 causes the imaging section 106 to generate captured image data in a situation in which the projection position detection pattern I2 is projected on the projection surface 5a. Captured image data that the imaging section 106 generates by capturing an image of the projection position detection pattern I2 on the projection surface 5a is hereinafter referred to as "dot captured image data."

Further, the imaging controller 42 causes the imaging section 106 to generate captured image data in a situation in which the object detection pattern I3 is projected on the projection surface 5a. Captured image data that the imaging section 106 generates by capturing an image of the object detection pattern I3 on the projection surface 5a is hereinafter referred to as "object captured image data."

The projection position detector 43 detects the positions of the dots I2a to I2d shown in the projection position detection pattern I2 based on the dot captured image data. The projection position detector 43 is an example of a first detector.

The coordinate adjuster 44 generates a projection conversion matrix by using the result of the detection of the positions of the dots I2a to I2d detected by the projection position detector 43, that is, the positions of the dots I2a to I2d in the camera coordinate system and the positions of the dots I2a to I2d in the liquid crystal panel coordinate system. The coordinate adjuster 44 stores the projection conversion matrix in the storage 107. The coordinate adjuster 44 is an example of an adjuster.

In a case where distortion produced by the lens provided in the imaging section 106, for example, distortion produced by a fisheye lens affects the generation of the projection conversion matrix in the camera coordinate system, the coordinate adjuster 44 may instead generate the projection conversion matrix by using the positions of the dots I2a to I2d on the liquid crystal light valves 12, to which the liquid crystal panel coordinate system is applied, and the positions of the dots I2a to I2d in a standard coordinate system that is the camera coordinate system having undergone correction of the effect of the distortion produced by the lens in the imaging section 106.

The object detector 45 detects the positions of the objects 7 based on the object captured image data. The object detector 45 is an example of a second detector.

The bus 10 couples the operation receiver 101, the image processor 102, the light valve driver 103, the light source driver 105, the imaging section 106, the storage 107, and the controller 108 to each other.

A3. Trapezoidal Distortion Correction

Figure 3:
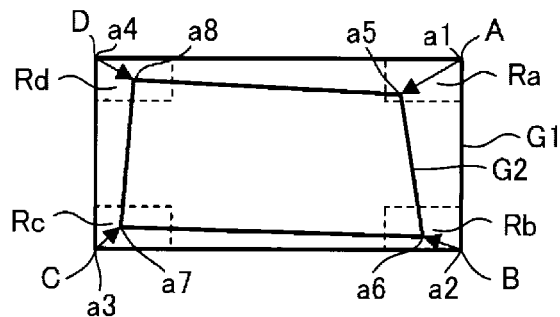
FIG. 3 describes an example of trapezoidal distortion correction.

FIG. 3 describes an example of the trapezoidal distortion correction and shows a generation image generated by the liquid crystal light valves 12.

The distortion corrector 102b performs the trapezoidal distortion correction by separately moving a first corner A, a second corner B, a third corner C, and a fourth corner D, which form the four corners of a first image G1 indicated by the image data, in accordance with an input of operation received by the operation receiver 101 to produce a second image G2. The first image and the second image are each an example of a generation image.

In the example shown in FIG. 3, the distortion corrector 102b moves the first corner A from a first position a1 to a fifth position a5, moves the second corner B from a second position a2 to a sixth position a6, moves the third corner C from a third position a3 to a seventh position a7, and moves the fourth corner D from a fourth position a4 to an eighth position a8. In a case where the first image G1 is projected toward the projection surface 5a and the projection image has trapezoidal distortion, the projector 1 can perform the trapezoidal distortion correction on the projection image by projecting the second image G2 in place of the first image G1.

FIG. 3 shows a first range Ra, a second range Rb, a third range Rc, and a fourth range Rd.

The first range Ra is a range over which the first corner A is movable in accordance with the trapezoidal distortion correction. In other words, the distortion corrector 102b moves the first corner A within the first range Ra. The second range Rb is a range over which the second corner B is movable in accordance with the trapezoidal distortion correction. In other words, the distortion corrector 102b moves the second corner B within the second range Rb. The third range Rc is a range over which the third corner C is movable in accordance with the trapezoidal distortion correction. In other words, the distortion corrector 102b moves the third corner C within the third range Rc. The fourth range Rd is a range over which the fourth corner D is movable in accordance with the trapezoidal distortion correction. In other words, the distortion corrector 102b moves the fourth corner D within the fourth range Rd.

A4. Image

An example of a variety of pieces of information stored by storage 107 will next be described.

The variety of pieces of information are, for example, image data used by the image combiner 102a. The image data used by the image combiner 102a includes, for example, the guide image data, the image data for projection position detection, and the image data for object detection.

The guide image data, the image data for projection position detection, and the image data for object detection may not be stored in the storage 107 in advance and may be generated by the controller 108.

The guide image data, the image data for projection position detection, and the image data for object detection will be described below.

A4-1. Guide Image I1

Figure 4:
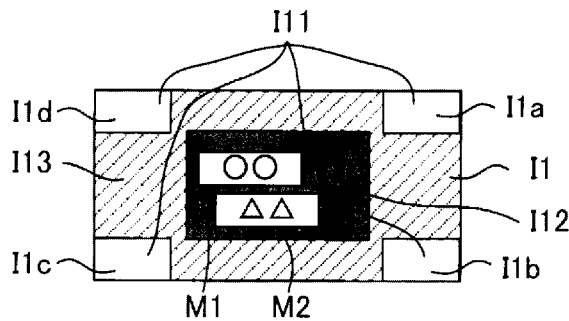
FIG. 4 shows an example of a guide image.

FIG. 4 shows an example of the guide image I1 based on the guide image data. The guide image I1 has a first area I11 and a second area I12. The guide image I1 in the present embodiment includes a first background I13, which is shown in the form of oblique lines in FIG. 4, and the color of the first background I13 is, for example, black. The color of the first background I13 is not limited to black and only needs to at least differ from the color of the first area I11. For example, the color of the first background I13 may differ from the color of the first area I11 and the color of the second area I12.

The first area I11 represents a range over which the four corners of the projection image, that is, the first corner A, the second corner B, the third corner C, and the fourth corner D are movable in accordance with the distortion correction performed by the distortion corrector 102b. The first area I11 is drawn, for example, in white.

The first area I11 has an upper right area I1a, a lower right area I1b, a lower left area I1c, and an upper left area I1d. The upper right area I1a represents a range over which the first corner A is movable in accordance with the distortion correction performed by the distortion corrector 102b. The lower right area I1b represents a range over which the second corner B is movable in accordance with the distortion correction performed by the distortion corrector 102b. The lower left area I1c represents a range over which the third corner C is movable in accordance with the distortion correction performed by the distortion corrector 102b. The upper left area I1d represents a range over which the fourth corner D is movable in accordance with the distortion correction performed by the distortion corrector 102b.

The positional relationship among the upper right area I1a, the lower right area I1b, the lower left area I1c, and the upper left area I1d in the guide image I1 is the same as the positional relationship among the first range Ra to the fourth range Rd in the first image G1 shown in FIG. 3.

The upper right area I1a, the lower right area I1b, the lower left area I1c, and the upper left area I1d each have, for example, a rectangular shape. The shape of each of the upper right area I1a, the lower right area I1b, the lower left area I1c, and the upper left area I1d is not limited to a rectangular shape and is changeable as appropriate in accordance with the trapezoidal distortion correction performed by the distortion corrector 102b.

The second area I12 represents the area where the projection position detection pattern I2 is projected. The second area I12 is drawn, for example, in white. The second area I12 has, for example, a rectangular shape. The shape of the second area I12 is not limited to a rectangular shape and is changeable as appropriate.

The guide image I1 further shows a first message M1, which prompts adjustment of both or one of the position of the guide image I1 and the positions of the objects 7 in such a way that the objects 7 are located in the first region I11. In the case where the upper right area I1a, the lower right area I1b, the lower left area I1c, and the upper left area I1d each have a rectangular shape, the first message M1 goes, for example, "Adjust the projection position in such a way that the objects fall within the white rectangles at the four corners of the projection area." The first message M1 can be changed as appropriate to any message that prompts positioning of the objects 7 in the first area I11. The first message M1 may instead be shown in the second area I12 or the first background I13.

The guide image I1 further shows a second message M2, which prompts positioning of the second area I12 in the projection area 8. In the case where the second area I12 has a rectangular shape, the second message M2 goes, for example, "Adjust the projection position in such a way that the rectangular area at the center of the projection image falls within the projection surface." The second message M2 can be changed as appropriate to any message that prompts positioning of the second area I12 in the projection area 8. The second message M2 may instead be shown in the second area I12 or the first background I13.

The guide image I1 may show only one of the first message M1 and the second message M2 or may show both the first message M1 and the second message M2.

A4-2. Projection Position Detection Pattern I2

Figure 5:
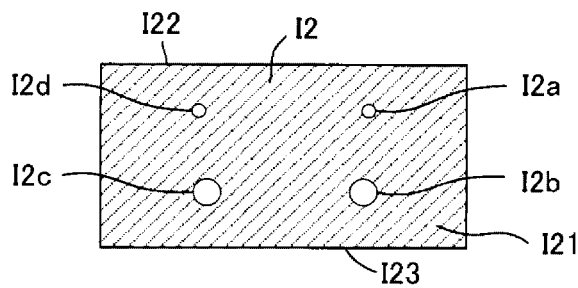
FIG. 5 shows an example of a projection position detection pattern.

FIG. 5 shows an example of the projection position detection pattern I2 based on the image data for projection position detection.

The projection position detection pattern I2 has white dots I2a to I2d shown in a black second background I21. The color of the second background I21 is not limited to black and only needs to differ from the color of the dots I2a to I2d. The projection position detection pattern I2, in more detail, the dots I2a to I2d are used to generate the projection conversion matrix. The dots I2a to I2d each have, for example, a Gaussian luminance distribution. The luminance distribution in each of the dots, is not limited to a gradating luminance distribution, such as a Gaussian distribution, and may instead be a non-gradating luminance distribution.

The dots I2b and I2c are each an example of a first mark. The dots I2a and I2d are each an example of a second mark. The first mark and the second mark are each not limited to a dot and changeable as appropriate. For example, the first mark and the second mark may each not be a circular dot and may each be a rectangular mark or a hexagonal or any other polygonal mark.

In the case where the projector 1 installed as shown in FIG. 1 projects the projection position detection pattern I2 on the projection surface 5a, the side of an upper end I22 of the projection position detection pattern I2 on the projection surface 5a is closest to the imaging section 106, and the side of a lower end I23 of the projection position detection pattern I2 is farthest from the imaging section 106.

In more detail, a position in the projection position detection pattern I2 on the projection surface 5a is closer to the imaging section 106 when closer to the upper end I22 and farther from the imaging section 106 when closer to the lower end I23.

The dots shown in the projection position detection pattern I2 on the projection surface 5a each have a smaller size in a dot captured image P1 indicated by the dot captured image data when farther from the imaging section 106.

In view of the fact described above, the projection position detection pattern I2 projected by the projector 1 is so set as shown in FIG. 5 that the difference in size among the dots I2a to I2d in the dot captured image P1 is smaller than in a case where the dots I2a to I2d shown in the projection position detection pattern I2 have the same size.

Specifically, the distance between the upper end I22 and the dot I2b is longer than the distance between the upper end I22 and the dot I2a. The size of the dot I2b is greater than the size of the dot I2a. Similarly, the distance between the upper end I22 and the dot I2c is longer than the distance between the upper end I22 and the dot I2d. The size of the dot I2c is greater than the size of the dot I2d.

The sizes of the dots I2a to I2d in the projection position detection pattern I2 are so set in advance for each product of the projector 1 that the dots I2a to I2d are the same or substantially the same size in the dot captured image P1.

In the present embodiment, the bottom surface of the projector 1 is supported by the first support apparatus 3, which is installed on the ceiling 2. On the other hand, the projector 1 has the following installation modes: a ceiling suspension mode in which the projector 1 is suspended from the ceiling; and a normal attitude mode in which the projector 1 is installed on a base, such as a table. A projection image projected in the ceiling suspension mode and a projection image projected in the normal attitude mode are horizontally and vertically reversed with respect to each other. The names of the normal attitude mode and the ceiling suspension mode are each changeable as appropriate.

Projector 1 determines the sizes of the dots I2a to I2d in the projection position detection pattern I2 based on the information on the installation mode and a parameter that identifies the sizes of the dots I2a to I2d in such a way that the dots I2a to I2d are likely to have the same or substantially the same size in the dot captured image P1.

The situation in which the dots I2a to I2d have substantially the same size in the dot captured image P1 may mean, for example, that the difference in size between the largest dot and the smallest dot out of the dots I2a to I2d in the dot captured image P1 falls within 5% of the diameter of the smallest dot or 10% of the diameter thereof. The definition described above is changeable as appropriate, and the dots I2a to I2d only need to have substantially the same size to the extent that detection of the center of gravity of each of the dots, which will be described later, is precisely performed.

In the present embodiment, the sizes of the dots I2a to I2d in the projection position detection pattern I2 are so set at the stage of manufacturing the projector 1 that the dots I2a to I2d in the dot captured image P1 have the same size set in the state in which the projector 1 is set in a typical conceivable use condition.

The distance between the upper end I22 and the dot I2a is equal to the distance between the upper end I22 and the dot I2d. The size of the dot I2a is equal to the size of the dot I2d. The distance between the upper end I22 and the dot I2a may differ from the distance between the upper end I22 and the dot I2d. In this case, the sizes of the dots I2a and I2d are each so set that the dot is larger when the distance from the upper end I22 to the dot is longer.

The distance between the upper end I22 and the dot I2b is equal to the distance between the upper end I22 and the dot I2c. The size of the dot I2b is equal to the size of the dot I2c. The distance between the upper end I22 and the dot I2b may differ from the distance between the upper end I22 and the dot I2c. In this case, the sizes of the dots I2b and I2c are each so set that the dot is larger when the distance from the upper end I22 to the dot is longer, as are the sizes of the dots I2a and I2d.

The sizes of the dots I2a to I2d in the projection position detection pattern I2 may differ from one another.

A4-3. Object Detection Pattern I3

Figure 6:
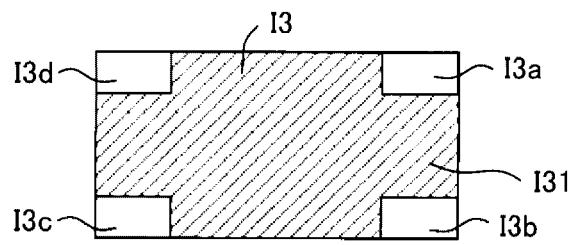
FIG. 6 shows an example of an object detection pattern.

FIG. 6 shows an example of the object detection pattern I3 based on the image data for object detection. The object detection pattern I3 has white patterns I3a to I3d shown on a black third background 131. The color of the first background I13 is not limited to black and only needs to differ from the color of the patterns I3a to I3d. The color of the patterns I3a to I3d is not limited to white and only needs to differ from the color of the third background I31. The object detection pattern I3 is used to detect the objects 7.

The positional relationship among the patterns I3a to I3d is the same as the positional relationship among the upper right area I1a, the lower right area I1b, the lower left area I1c, and the upper left area I1d in the guide image I1 shown in FIG. 4. Therefore, when the position of the guide image I1 is set in accordance with the guide image I1, the first object 7a is irradiated with the pattern I3a, the second object 7b is irradiated with the pattern I3b, the third object 7c is irradiated with the pattern I3c, and the fourth object 7d is irradiated with the pattern I3d.

The colors of the upper right area I1a, the lower right area I1b, the lower left area I1c, and the upper left area I1d shown in FIG. 4 may be the same as or may differ from the colors of the patterns I3a to I3d shown in FIG. 6.

The colors of the dots I2a to I2d shown in FIG. 5 are preferably the same as the colors of the patterns I3a to I3d shown in FIG. 6. To correct the distortion produced by the lens provided in the imaging section 106 in the camera coordinate system, the colors of the dots I2a to I2d shown in FIG. 5 and the patterns I3a to I3d shown in FIG. 6 are desirably close to the color corresponding to the wavelength component of the parameter used to correct the distortion produced by the lens provided in the imaging section 106. In this case, for example, the color of the dots shown in FIG. 5 and the color of the patterns shown in FIG. 6 are not white but are desirably green.

A5. Action

Figure 7:
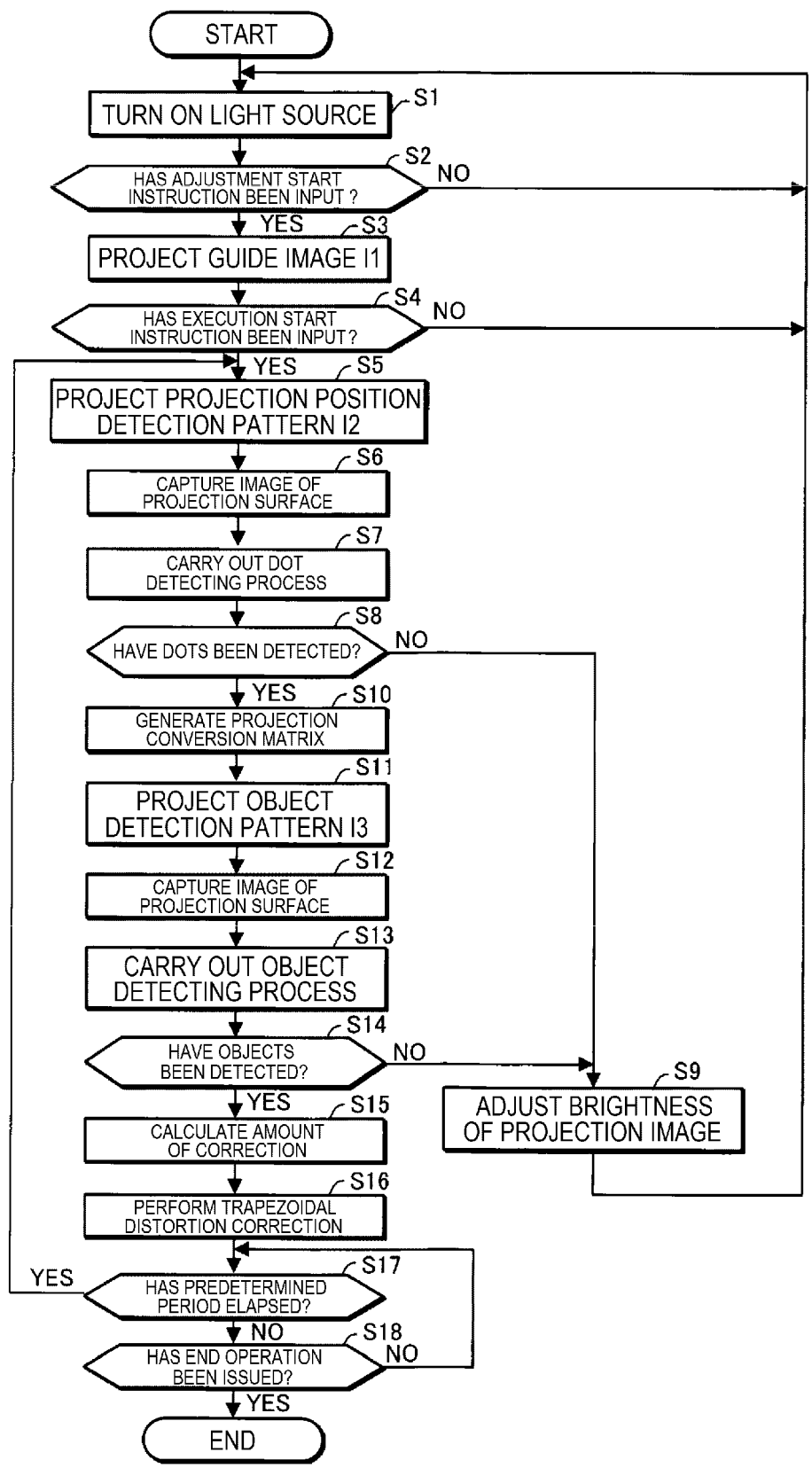
FIG. 7 is a flowchart for describing the action of the projector.

The sequence of the action of the projector 1 will next be described. FIG. 7 is a flowchart for describing the sequence of the action of the projector 1.

First, the projection board 5, on which the objects 7 are placed at the corresponding four corners of the projection surface 5a, is suspended from the ceiling 2 via the second support apparatus 6, as shown in FIG. 1 by way of example. Since the objects 7 are placed at the corresponding four corners of the projection surface 5a, the entire projection surface 5a forms the projection area 8.

The user subsequently operates the operation receiver 101 to power on the projector 1. When the projector 1 is powered on, the projection controller 41 controls the light source driver 105 to turn on the light source 11 in step S1 shown in FIG. 7.

The user subsequently operates the operation receiver 101 to input an adjustment start instruction of start of automatic adjustment of the shape of a projection image.

When the operation receiver 101 receives the adjustment start instruction in step S2, the projection controller 41 reads the guide image data from the storage 107 and provides the image combiner 102a with the guide image data. The projection controller 41 subsequently sets the amount of correction in the trapezoidal distortion correction performed by the distortion corrector 102b at zero. The order in which the process of providing the image combiner 102a with the guide image data may be carried out first and the process of setting the amount of correction in the trapezoidal distortion correction at zero are carried out does not matter, and either of the two processes may be carried out first.

In a case where the operation receiver 101 receives no adjustment start instruction in a specified period in step S2, the control may return to the process in step S1, may return to the start of step S2, or may terminate the entire process.

The image processor 102 subsequently generates an image signal based on the guide image data. Subsequently, in step S3, the projection section 104 projects the guide image I1 corresponding to FIG. 4 on the projection surface 5a in accordance with the image signal based on the guide image data. An example of the projection of the guide image I1 will be described later with reference to FIG. 8.

The user is prompted by the guide image I1 projected in step S3, for example, by the first message M1 or the second message M2 to manually adjust the orientation or position of the projector 1 or the positions of the objects 7. For example, the user manually adjusts the orientation or position of the projector 1 or the positions of the objects 7 in such a way that the first object 7a is located in the upper right area I1a, the second object 7b is located in the upper right area I1b, the third object 7c is located in the lower left area I1c, the fourth object 7d is located in the upper left area I1d, and the second areas I12 is located on the projection surface 5a.

Having completed the manual adjustment according to the guide image I1 projected in step S3, the user operates the operation receiver 101 to input an execution start instruction of start of execution of the automatic adjustment of the shape of the projection image.

When the operation receiver 101 receives the execution start instruction in step S4, the projection controller 41 reads the image data for projection image detection from the storage 107 and provides the image combiner 102a with the image data for projection image detection. The image processor 102 generates an image signal based on the image data for projection image detection.

In a case where the operation receiver 101 receives no execution start instruction in a specified period in step S4, the control may return to the process in step S1, may return to the start of step S4, or may terminate the entire process.

When the image processor 102 generates an image signal based on the image data for projection image detection, the projection section 104 projects the projection position detection pattern I2 corresponding to FIG. 5 in step S5 in accordance with the image signal based on the image date for projection position detection. An example of the projection of the projection position detection pattern I2 will be described later with reference to FIG. 9.

The imaging controller 42 subsequently causes the imaging section 106 to capture an image of the projection position detection pattern I2 displayed on the projection surface 5a in step S6. The imaging section 106 generates the dot captured image data by capturing an image of the projection surface 5a on which the projection position detection pattern I2 has been projected.

In step S6, the imaging controller 42 adjusts the exposure set in the imaging section 106, for example, in such a way that the highest luminance of the dots I1a to I1d indicated by the dot captured image data falls within a predetermined range and then causes the imaging section 106 to capture an image of the projection surface 5a. An example of the dot captured image P1 indicated by the dot captured image data will be described later with reference to FIG. 10.

The projection position detector 43 subsequently carries out in step S7 the process of detecting the positions of the dots I2a to I2d in the dot captured image P1 indicated by the dot captured image data.

The projection position detector 43 may use the difference between the dot captured image data and captured image data generated by the imaging section 106 having an exposure value set when the dot captured image data is generated in a situation in which the projection section 104 projects an entirely black image. In this case, a situation in which environmental light affects the detection of the dots I2a to I2d can be avoided.

In step S7, the projection position detector 43 detects, as dots I2a to I2d, portions of the dot captured image P1 that are portions each having luminance higher than the lowest luminance by at least a first threshold and each larger than or equal to a first specified size but smaller than or equal to a second specified size. The second specified size is greater than the first specified size. In the dot captured image P1, the portions each having luminance higher than the lowest luminance by at least the first threshold and each larger than or equal to the first specified size but smaller than or equal to the second specified size are hereinafter referred to as "dot portions."

In step S7, the projection position detector 43 further detects the centers of gravity of the dot portions as the positions of the dots I2a to I2d.

The projection position detector 43 may instead detect the position of the center of gravity of each of the dot portions by also using the luminance distribution in the dot portion. For example, the projection position detector 43 weights each of the pixels that form each of the dot portions based on the luminance of the pixel and detects the position of the center of gravity of the weighted dot portion.

Subsequently, when none of the dots I2a to I2d is detected in step S8, the projection controller 41 subsequently sets the brightness of the projection image to be lower than the current brightness in step S9.

In step S8, the situation in which none of the dots I2a to I2d is detected in step S8 is, for example, conceivably a situation in which a change in the attitude of the projector 1 due, for example, to the weight of the projector 1 itself causes any of the dots I2a to I2d not to fall within the projection surface 5a. In the situation described above, it is difficult to detect all the dots I2a to I2d even after the brightness of the dots I2a to I2d is adjusted.

Therefore, in step S9, to make the projection image projected on the projection surface 5a but shifted therefrom less noticeable, the projection controller 41 set the brightness of the projection image at a value smaller than 100%, provided that the brightness of the projection image when the projection position detector 43 determines that none of the dots I2a to I2d is detected is 100%. For example, the projection controller 41 sets the brightness of the projection image at 30% in step S9. The brightness lower than 100% is not limited to the brightness of 30%. For example, the brightness lower than 100% may be a brightness of 0%. The brightness of 0% means that the projection image is entirely black. After step S9, the control returns to step S1.

On the other hand, when the dots I2a to I2d are detected in step S8, the coordinate adjuster 44 calculates in step S10 the projection conversion matrix, which converts the camera coordinate system into the liquid crystal panel coordinate system, based on the positional relationship between the coordinates of the center of gravity of each of the dots I2a to I2d identified from the image data for projection position detection in the liquid crystal panel coordinate system and the coordinates of the center of gravity of each of the dots 12a to 12d identified from the dot captured image data for projection position detection in the camera coordinate system. The coordinate adjuster 44 subsequently stores the projection conversion matrix in the storage 107.

The projection controller 41 subsequently reads the image data for object detection from the storage 107 and provides the image combiner 102a with the image data for object detection. The image processor 102 generates an image signal based on the image data for object detection.

The projection section 104 subsequently projects the object detection pattern I3 corresponding to FIG. 6 in accordance with the image signal on the projection surface 5a in step S11. An example of the projection of the object detection pattern I3 will be described later with reference to FIG. 11.

The object detection pattern I3 is used to detect light reflected off the objects 7. In the present embodiment, to make the light reflected off the objects 7 readily detectable, white images are used as the pattern I3a to I3d contained in the object detection pattern I3.

The imaging controller 42 subsequently causes the imaging section 106 to capture an image of the object detection pattern I3 projected on the projection surface 5a in step S12. The imaging section 106 generates the object captured image data by capturing an image of the projection surface 5a on which the object detection pattern I3 has been projected.

In step S12, the imaging controller 42 adjusts the exposure set in the imaging section 106 in such away that the luminance of the patterns I3a to I3d indicated by the object captured image data falls within a predetermined range and then causes the imaging section 106 to capture an image of the projection surface 5a, as in the process of capturing of an image of the projection position pattern.

In the present embodiment, a recursive reflection member is used as each of the objects 7. Therefore, when the objects 7 are irradiated with the light that forms the object detection pattern I3 from the projector 1, the objects 7 reflect the light toward the imaging section 106 of the projector 1. The objects 7 therefore have luminance higher than that of a portion the captured image that is the portion around the objects 7.

When the imaging section 106 generates the object captured image data, the object detector 45 first detects in step S13 areas of an object captured image indicated by the object captured image data that are the areas where the luminance is higher than that of the portion around the areas as object areas where the objects 7 are present. The object detector 45 subsequently detects the positions of the centers of gravity of the object areas on an object area basis as the positions of the centers of gravity of the objects 7.

The objects 7 desirably each have a shape and a reflection characteristic that increase the precision of the detection of the centers of gravity. For example, it is desirable that the objects 7 each have a circular shape in the plan view and have a reflection characteristic that provides higher reflectance in a position closer to the center of gravity of the object 7.

The object detector 45 may carry out the process of detecting the positions of the objects 7 by using the difference between the object captured image data and captured image data generated by the imaging section 106 having an exposure value set when the object captured image data is generated in the situation in which the projection section 104 projects an entire black image as described above. In this case, the situation in which environmental light affects the detection of the objects 7 can be avoided.

The position of each of the objects 7 is not limited to the position of the center of gravity of the object 7 and is changeable as appropriate. For example, when the objects 7 each have a polygonal shape, for example, when the objects 7 each have a quadrangular shape or an L-letter shape, a vertex, an edge, or a corner of the object 7 may be used as the position of the object 7. In a case where the objects 7 each have a three-dimensional shape having a thickness, the object detector 45 may determine the position of the object 7 in consideration of the amount of offset corresponding to the thickness.

Subsequently, when none of the objects 7, in more detail, the position of the center of gravity of none of the objects 7 is detected in step S14, step 9 is carried out.

On the other hand, when the objects 7, in more detail, the position of the center of gravity of each of the objects 7 is detected in step S14, the coordinate adjustor 44 calculates position information representing the position of the projection range in the liquid crystal panel coordinate system in step S15 as the amount of correction in the trapezoidal distortion correction performed by the distortion corrector 102b.

The projection range in the liquid crystal panel coordinate system is a range of the pixel area 12a of each of the liquid crystal light valves 12 shown in FIG. 2 that is the range where an image to be projected on the entirety or part of the projection area 8 is generated. An area of the pixel area 12a that is the area where an image to be projected on the entire projection area 8 is generated is hereinafter referred to as a "specific area."

In step S15, the coordinate adjuster 44 uses the projection conversion matrix produced in step S10 to convert the positions of the objects 7 in the captured image in the camera coordinate system into the coordinate positions in the liquid crystal panel coordinate system. The coordinate adjuster 44 subsequently determines, for example, a quadrangular area the vertices of which coincide with the positions of the four objects 7 on each of the liquid crystal light valves 12, that is, the specific area as the projection range.

The coordinate adjuster 44 may calculate the projection range in such a way that the outer edge of the generation image is located inside the outer edge of the specific area.

For example, the coordinate adjuster 44 first generates a projection conversion matrix for the trapezoidal distortion correction, which converts the positions of the four corners of each of the pixel areas 12a in the liquid crystal panel coordinate system into the positions of the four corners of the specific area in the liquid crystal panel coordinate system. The coordinate adjuster 44 subsequently calculates, for each of the positions of the four corners of each of the pixel areas 12a in the liquid crystal panel coordinate system, a corrected position separate from the position of the corner toward the position of the center of the pixel area 12a by a predetermined amount of offset. The coordinate adjuster 44 subsequently uses the projection conversion matrix for the trapezoidal distortion correction to convert the corrected positions for the positions of the four corners of the pixel area 12a into the positions of the four corners of the projection range contained in the specific area.

The method for calculating the projection range contained in the specific area is not limited to the method described above and is changeable as appropriate. For example, reduction operation of reducing the magnification at which the specific area is magnified to set the projection range contained in the specific area may be performed by using an OSD (on-screen display) menu, or the reduction operation may be performed by using a remote control.

The coordinate adjuster 44 subsequently sets information on the position of the projection range in the distortion corrector 102b.

Subsequently, after the information on the position of the projection range is set, the distortion correction 102b performs in step S16 the trapezoidal distortion correction on the output from the image combiner 102a based on the position information. An example of a post-trapezoidal-distortion-correction projection image P will be described later with reference to FIG. 12.

After step S16 is carried out, it is conceivable that the attitude of the projector 1 changes due, for example, to the weight of the projector 1 itself as described above. In this case, the projection image after the trapezoidal distortion correction undesirably extends off the projection area 8.

To address the problem described above, the processes in step S5 and the following steps are carried out after a predetermined period elapses in step S17 from the end of step S16.

In a situation in which the predetermined period has not elapsed in step S17 from the end of step S16, and when the operation receiver 101 has received no end operation, the control returns to the process in step S17, whereas when the operation receiver 101 has received the end operation, the entire process is terminated.

A6. Projection Image and Captured Image

Examples of the projection image and the captured image will next be described.

A6-1. Projection Image of Guide Image I1

Figure 8:
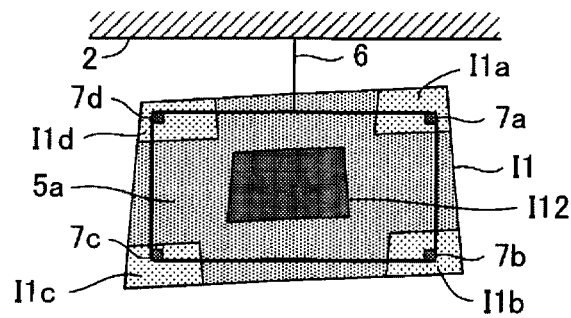
FIG. 8 shows an example of projection of the guide image.

FIG. 8 shows an example of the projection image of the guide image I1 projected in step S3. In the example shown in FIG. 8, in which the projection image is projected in an area containing the projection surface 5a, the projection image of the guide image I1 has trapezoidal distortion resulting, for example, from the relative positional relationship between the projector 1 and the projection surface 5a.

A6-2. Projection Image of Projection Position Detection Pattern I2

Figure 9:
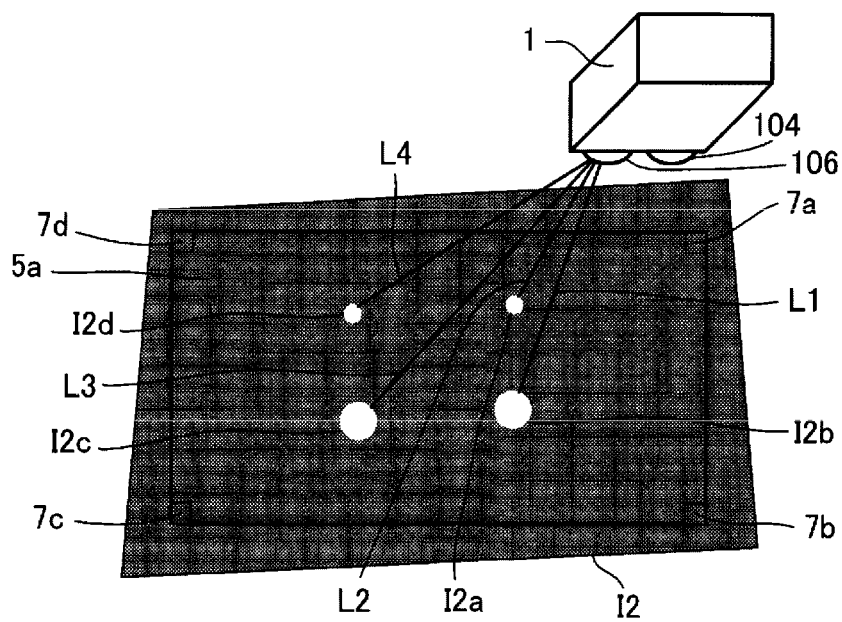
FIG. 9 shows an example of projection of the projection position detection pattern.

FIG. 9 shows an example of the projection image of the projection position detection pattern I2 projected in step S5.

The projector 1 projects the projection position detection pattern I2 toward the projection surface 5a located obliquely below the projector 1, as described above.

A first distance L1 between the dot I2b projected on the projection surface 5a and the imaging section 106 is therefore longer than a second distance L2 between the dot I2a projected on the projection surface 5a and the imaging section 106. A third distance L3 between the dot I2c projected on the projection surface 5a and the imaging section 106 is therefore longer than a fourth distance L4 between the dot I2d projected on the projection surface 5a and the imaging section 106.

Since the size of the dot I2b is greater than the size of the dot I2a in the projection position detection pattern I2, as described with reference to FIG. 5, the size of the dot I2b is greater than the size of the dot I2a on the projection surface 5a. Similarly, since the size of the dot I2c is greater than the size of the dot I2d in the projection position detection pattern I2, the size of the dot I2c is greater than the size of the dot I2d on the projection surface 5a.

A6-3. Dot Captured Image P1

Figure 10:
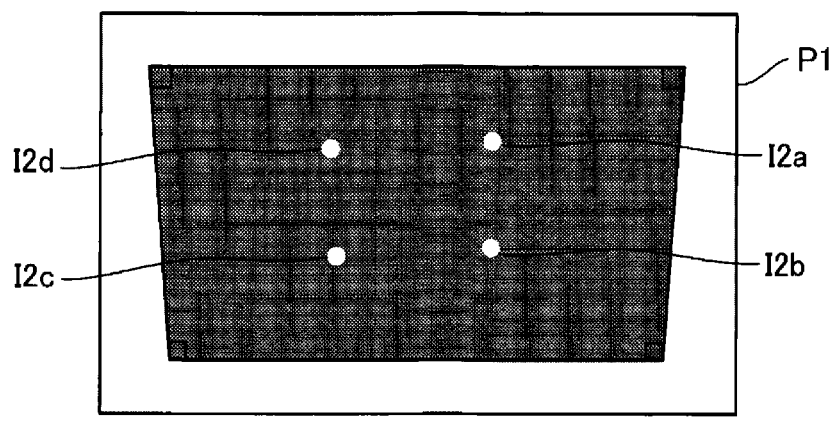
FIG. 10 shows an example of a dot captured image.

FIG. 10 shows an example of the dot captured image P1 indicated by the dot captured image data generated in step S6. In FIG. 10, the dot captured image P1 contains an area wider than the projection surface 5a, and the dot captured image P1 may instead be only the area corresponding to the projection surface 5a and generated, for example, by masking.

The dots I2a to I2d located on the projection surface 5a are each reduced in size by a greater amount in the dot captured image P1 when the distance from the imaging section 106 to the dot is longer, as described above.

Therefore, when the imaging section 106 captures an image of the dots I2a to I2d shown in FIG. 9, the difference in size between the dot I2a and the dot I2b in the dot captured image P1 is smaller than the difference in size between the dot I2a and the dot I2b on the projection surface 5a, and the difference in size between the dot I2c and the dot I2d in the dot captured image P1 is smaller than the difference in size between the dot I2c and the dot I2d on the projection surface 5a.

In more detail, the difference in size among the dots I2a to I2d in the dot captured image P1 is smaller than the difference in size among the dots I2a to I2d on the projection surface 5a.

In the present embodiment, the dots I2a to I2d in the dot captured image P1 have the same size. The dots I2a to I2d in the dot captured image P1 may not have the same size and may, for example, have substantially the same size.

As described above, according to the present embodiment, the differences in size among the dots I2a to I2d in the dot captured image P1 are smaller than the differences in size among the dots I2a to I2d on the projection surface 5a.

Therefore, for example, the difference between the first specified size and the second specified size used in step S7 can be reduced, as compared with a case where the dots I2a to I2d on the projection surface 5a have the same size.

A common process of detecting the center of gravity can therefore be applied to all the dot portions. In a case where a plurality of dot portions that each undergo detection of the position of the center of gravity have sizes that greatly vary, the process of detecting the position of the center of gravity is separately required on a dot portion's size basis, but the necessity of such a process can be lowered in the present embodiment.

A6-4. Projection Image of Object Detection Pattern I3

Figure 11:
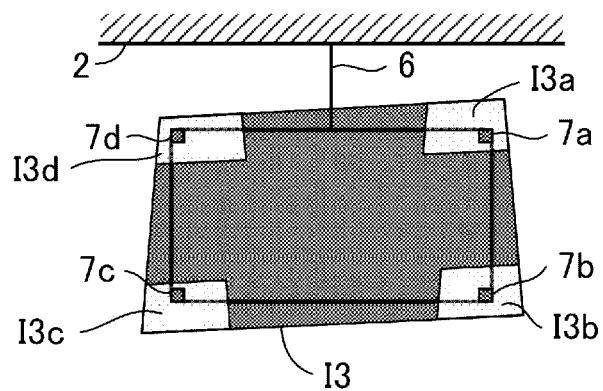
FIG. 11 shows an example of projection of the object detection pattern.

FIG. 11 is an example of the projection image of the object detection pattern I3 projected in step S11.

A6-5. Projection Image after Trapezoidal Distortion Correction

Figure 12:
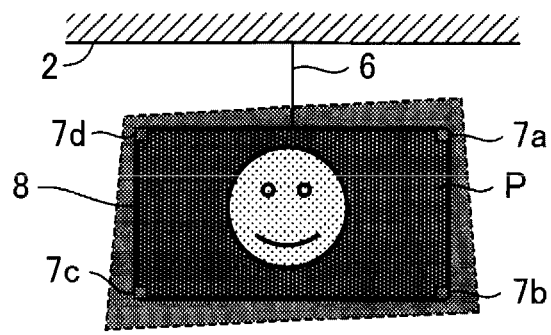
FIG. 12 shows an example of a post-trapezoidal-distortion-correction projection image.

FIG. 12 shows an example of the post-trapezoidal-distortion-correction projection image P projected after the trapezoidal distortion correction is performed in step S16. In the example shown in FIG. 12, the trapezoidal distortion correction has been so performed that the outer edge of the post-trapezoidal-distortion-correction projection image P coincides with the outer edge of the projection area 8.

Figure 13:
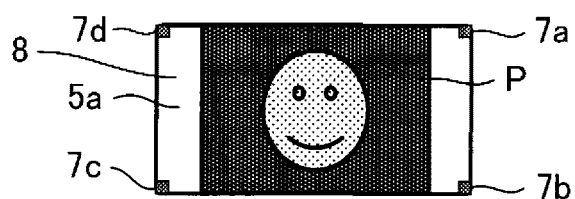
FIG. 13 shows another example of the post-trapezoidal-distortion-correction projection image.
Figure 14:
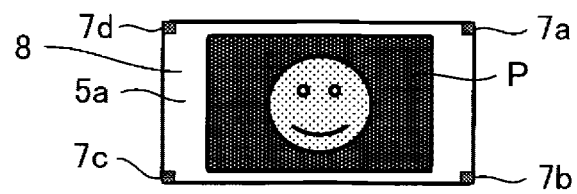
FIG. 14 shows still another example of the post-trapezoidal-distortion-correction projection image.

The trapezoidal distortion correction may be so performed that a projection image based on image data falls within the projection area 8 with the aspect ratio of the projection image maintained. In this case, the entire post-trapezoidal-distortion-correction projection image P falls within the projection area 8, and an area of the projection area 8 that is the area where no post-trapezoidal-distortion-correction projection image P is present is displayed in black, as shown in FIG. 13 or 14 by way of example. In this case, disorder of the aspect ratio of the post-trapezoidal-distortion-correction projection image P can be suppressed.

The arrangement of the post-trapezoidal-distortion-correction projection image P with respect to the projection area 8 is desirably selected, for example, by the user's operation on a menu before or after the automatic adjustment of the projection position starts.

A6-6. Projection Image Projected in Step S9

Figure 15:
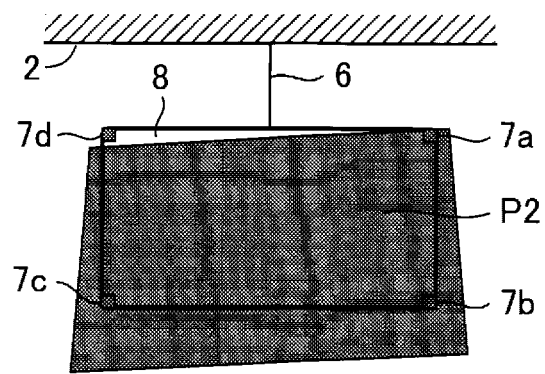
FIG. 15 shows an example of a 0% projection image.

FIG. 15 shows an example of a 0% projection image P2, which has the brightness of 0% and can be projected in step S9.

A7. Overview

In the projector 1 and the method for controlling the projector 1 according to the present embodiment, the first distance L1 between the dot I2b projected on the projection surface 5a and the imaging section 106 is longer than the second distance L2 between the dot I2a projected on the projection surface 5a and the imaging section 106, and the size of the dot I2b is greater than the size of the dot I2a.

The difference in size between the dot I2b and the dot I2a in the dot captured image P1 can therefore be smaller than the difference when the dots I2b and I2a having the same size on the projection surface 5a are displayed, whereby the positions of the dots I2b and I2a can be readily detected.

B. Variations

The embodiment described above can be changed in a variety of manners, for example, as will be described below. Further, one or more variations arbitrarily selected from the aspects of variation described below can be combined as appropriate with each other.

Variation 1

Figure 16:
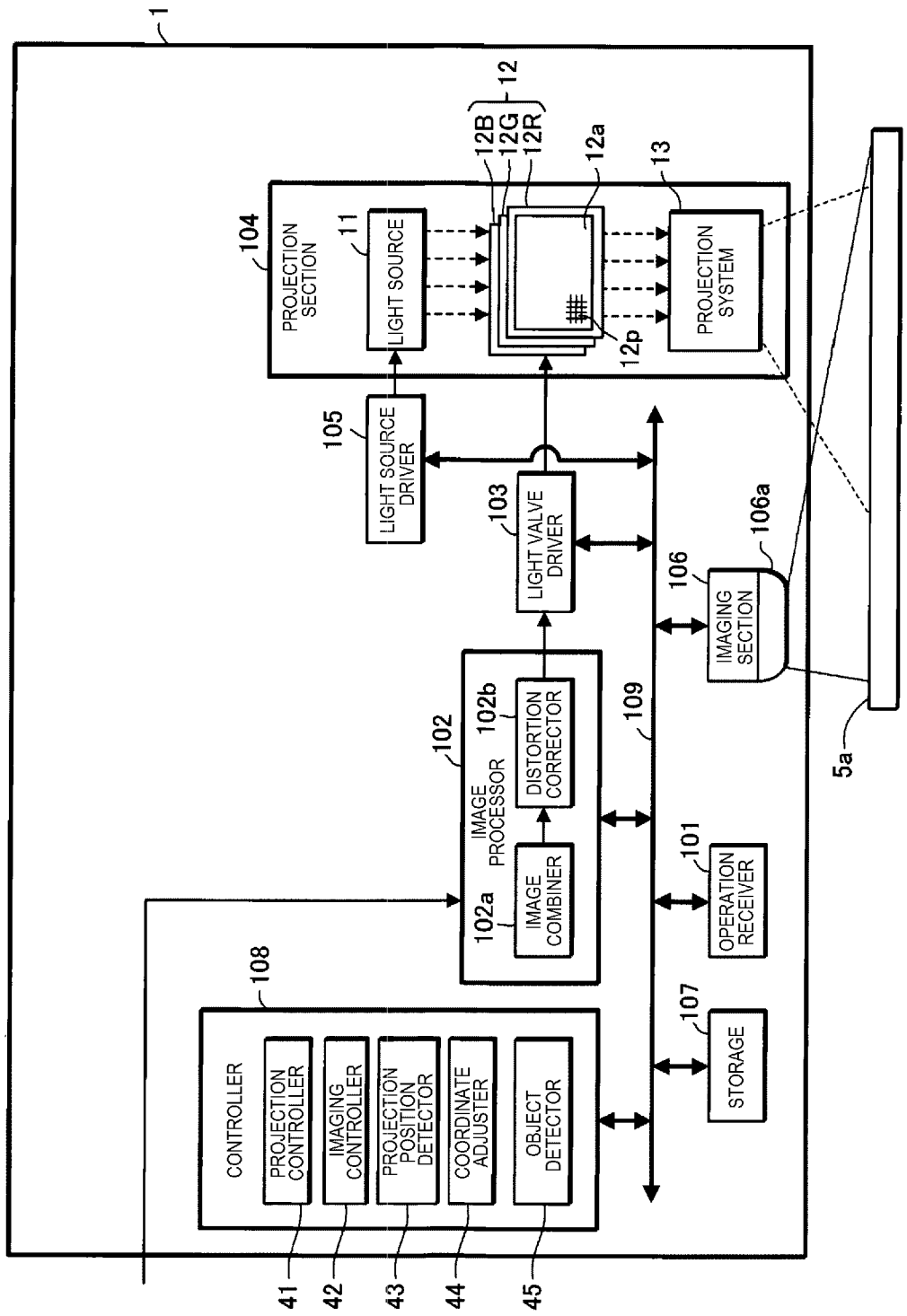
FIG. 16 shows an example of Variation 1.

In the first embodiment, the imaging section 106 may capture an image of a projection image displayed on the projection surface 5a via a fisheye lens 106a, as shown in FIG. 16 by way of example. In Variation 1, the position of the center of the fisheye lens 106a in the dot captured image P1 coincides with the center of the dot captured image P1. It is, however, noted that the position of the center of the fisheye lens 106a in the dot captured image P1 may not coincide with the center of the dot captured image P1.

In the case where the imaging section 106 in Variation 1 captures an image of a projection image on the projection surface 5a via the fisheye lens 106a, an image of a dot captured with a portion of the fisheye lens 106a that is a portion separate from the center of the fisheye lens 106a by a greater distance is reduced by a greater degree.

The projection section 104 projects the projection position detection pattern I2 on the projection surface 5a in such a way that the first distance L1 is longer than the second distance L2, the size of the dot I2b is greater than the size of the dot I2a, and the distance between the position of the center of the fisheye lens 106a in the dot captured image P1 and the dot I2b displayed in the dot captured image P1 is greater than or equal to the distance between the position of the center of the fisheye lens 106a in the dot captured image P1 and the dot I2a displayed in the dot captured image P1.

Therefore, even when the fisheye lens 106a affects the dots I2b and I2a in the dot captured image P1, the difference in size between the dots I2b and I2a in the dot captured image P1 can be reduced, whereby the positions of the dots I2b and I2a can be readily detected.

Variation 2

In the first embodiment and the Variation 1, the size of the projection position detection pattern I2 may be changed in accordance with a size change instruction that instructs a change in the size of a projection image.

Figure 17:
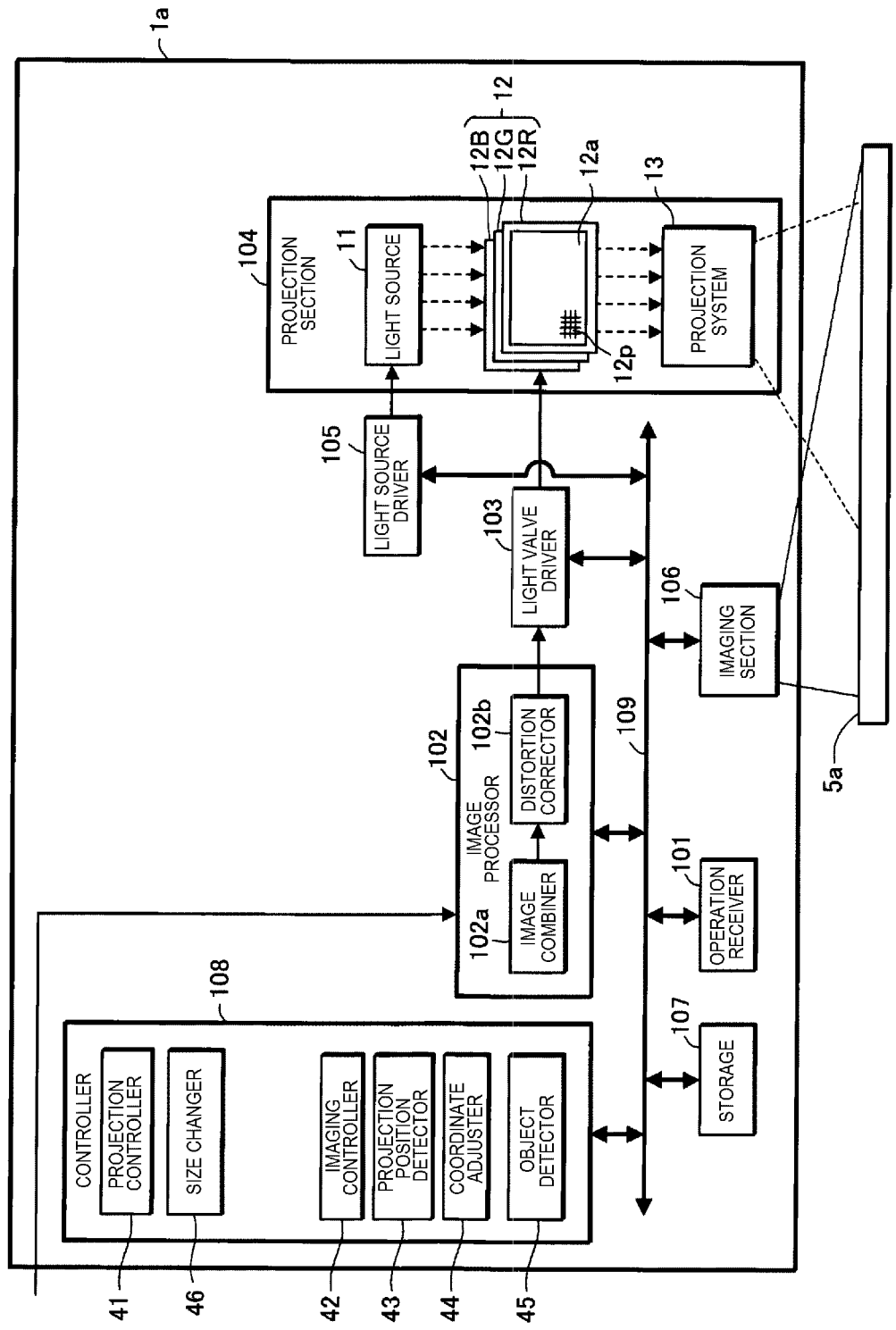
FIG. 17 shows an example of Variation 2.

FIG. 17 shows an example of Variation 2.

A projector 1a shown in FIG. 17 differs from the projector 1 shown in FIG. 2 in that the projector 1a includes a size changer 46. The projector 1a will be described below primarily on the difference from the projector 1.

The size changer 46 is achieved by causing the controller 108 to read and execute the program stored in the storage 107. The size changer 46 is an example of a second size changer.

When the operation receiver 101 receives the size change instruction, the size changer 46 changes the size of the projection image based on the size change instruction. In Variation 2, the operation receiver 101 is an example of a first receiver.

When the operation receiver 101 receives the size change instruction in the situation in which the projection section 104 projects the projection position detection pattern I2, the size changer 46 first changes the projection range over which a generation image is generated on each of the liquid crystal light valves 12 in accordance with the size change instruction.

For example, when the size change instruction indicates an increase in the size, the size changer 46 enlarges the projection range set in the liquid crystal light valves 12. On the other hand, when the size change instruction indicates a decrease in the size, the size changer 46 reduces the projection range set in the liquid crystal light valves 12. The process is also referred to as what is called electronic tele-widening in some cases.

In the case where the size change instruction indicates an increase in the size, the size changer 46 subsequently reduces the sizes of the dots I2a to I2d having been increased in association with the increase in the size of the projection position detection pattern I2 in such a way that the sizes the dots I2a to I2d are maintained after the projection position detection pattern I2 is enlarged. Specifically, the size changer 46 reduces the sizes of the dots I2a to I2d by changing the image data for projection position detection.

The size changer 46 may reduce the sizes of the dots I2a to I2d by changing the image data for projection position detection in advance in consideration of the degree of size increase indicated by the size change instruction, for example, the enlargement factor and may use the electronic tele-widening to enlarge the image data for projection position detection containing the dots I2a to I2d having the reduced sizes.

Further, when the size change instruction indicates a decrease in the size, the size changer 46 increases the sizes of the dots I2a to I2d having been reduced in association with the decrease in the size of the projection position detection pattern I2 in such a way that the sizes of the dots I2a to I2d are maintained after the projection position detection pattern I2 is reduced. Specifically, the size changer 46 increases the sizes of the dots I2a to I2d by changing the image data for projection position detection.

The size changer 46 may increase the sizes of the dots I2a to I2d by changing the image data for projection position detection in advance in consideration of the degree of size reduction indicated by the size change instruction, for example, the reduction factor and may use the electronic tele-widening to reduce the image data for projection position detection containing the dots I2a to I2d having the increased sizes.

The size changer 46 may change the projection range set in the liquid crystal light valves 12 in accordance with the size change instruction and produce the dots I2a to I2d in the changed projection range based on the image data for projection position detection. In this case, the size changer 46 does not change the sizes of the dots I2a to I2d generated in the changed projection range before or after the change of the projection range.

As described above, the size changer 46 changes the size of the projection position detection pattern I2 based on the size change instruction with the sizes of the dots I2a to I2d maintained. A situation in which the change in size of the projection position detection pattern I2 makes it difficult to detect the dots I2a to I2d can thus be avoided.

The size changer 46 may further change the sizes of the dots I2a to I2d after the change in size of the projection position detection pattern I2 based on the positions of the dots I2a to I2d shown in the projection position detection pattern I2 after the size change so that changes in positions of the dots I2a to I2d in association with the change in size of the projection position detection pattern I2 are unlikely to change the sizes of the dots I2a to I2d shown in the dot captured image P1. In this case, the size changer 46 changes the sizes of the dots I2a to I2d by changing the image data for projection position detection.

For example, relationship information representing the relationship between the positions of the dots and the sizes of the dots and created in the stage of manufacturing the projector 1 is stored the storage 107 in advance, and the size changer 46 uses the relationship information to adjust the sizes of the dots.

By way of example, since a dot that moves toward the lower end I23 shown in FIG. 5 in association with the change in size of the projection position detection pattern I2 is reduced in size in the dot captured image P1, the size changer 46 increases the size of the dot in accordance with the position to which the dot has moved in such a way that the decrease in the size is canceled. In this case, the size changer 46 increases the enlargement factor at which the size of the dot is increased as the travel of the dot increases.

On the other hand, since a dot that moves toward the upper end I22 shown in FIG. 5 in association with the change in size of the projection position detection pattern I2 is increased in size in the dot captured image P1, the size changer 46 reduces the size of the dot in accordance with the position to which the dot has moved in such a way that the increase in the size is canceled. In this case, the size changer 46 increases the reduction factor at which the size of the dot is reduced as the travel of the dot increases.

That is, the size changer 46 differentiates the degree of the change in sizes of the dots I2a to I2d based on the size change instruction from the degree of the change in size of the projection position detection pattern I2 based on the size change instruction.

Also in this case, the situation in which the change in size of the projection position detection pattern I2 makes it difficult to detect the dots I2a to I2d can be avoided. In this case, the size changer 46 is an example of a first size changer.

In Variation 2, when the imaging section 106 performs image capturing via a zoom lens that is not shown, the size changer 46 may change the size of the projection position detection pattern I2 by changing the zooming magnification of the zoom lens instead of using the electronic tele-widening.

In the configuration in which the size of the projection position detection pattern I2 is changed by changing the zooming magnification of the zoom lens, and when the zooming magnification of the zoom lens is increased, the size changer 46 reduces the sizes of the dots I2a to I2d in the projection position detection pattern I2 in such a way that the sizes of the dots I2a to I2d on the projection surface 5a are maintained. On the other hand, when the zooming magnification of the zoom lens is reduced, the size changer 46 increases the sizes of the dots I2a to I2d in the projection position detection pattern I2 in such a way that the sizes of the dots I2a to I2d on the projection surface 5a are maintained.

Variation 3

In the first embodiment and Variations 1 and 2, the position of the projection position detection pattern I2 and the sizes of the dots I2a to I2d may be changed in accordance with a position change instruction that instructs a change in the position of a projection image.

Figure 18:
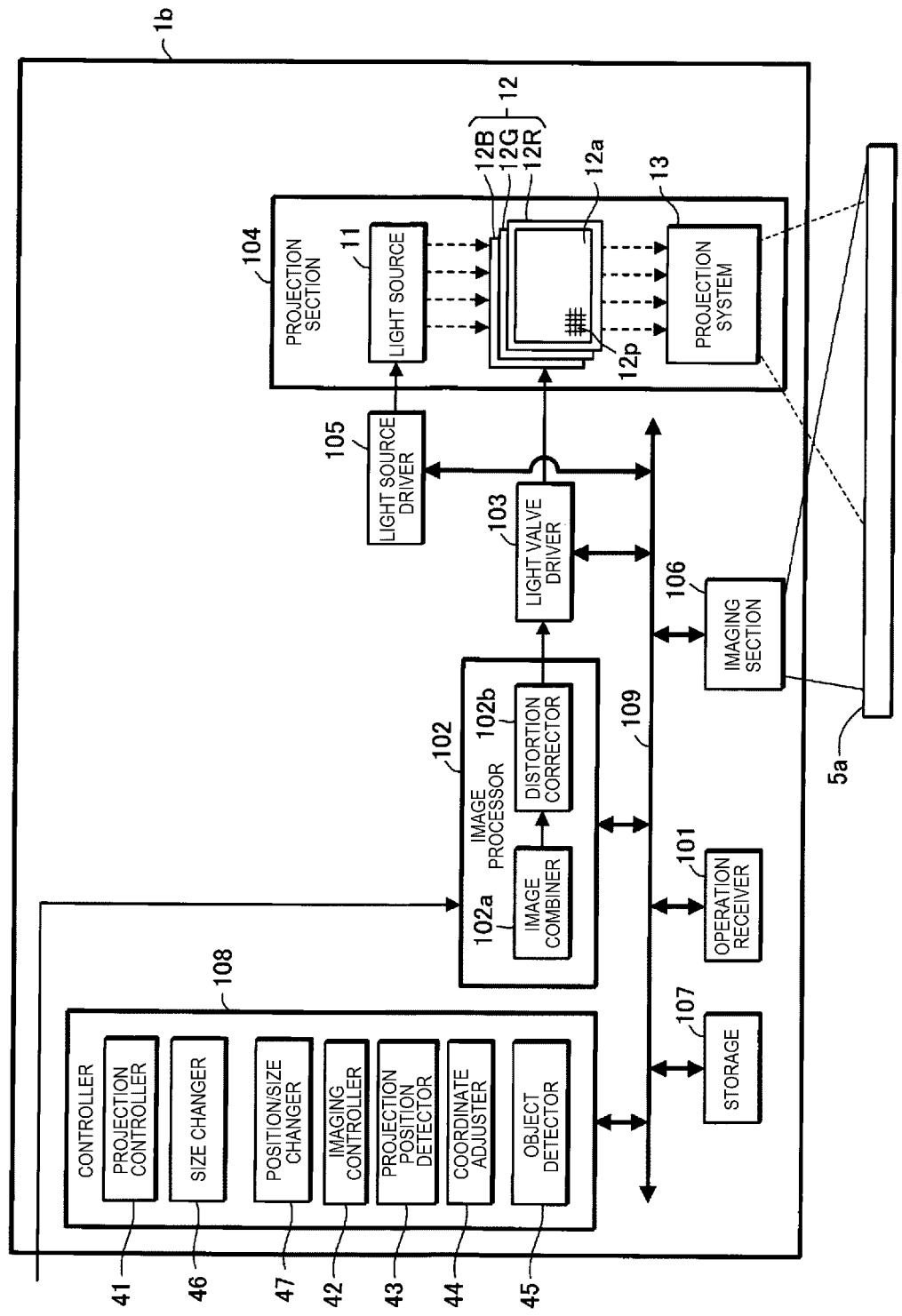
FIG. 18 shows an example of Variation 3.

FIG. 18 shows an example of Variation 3.

A projector 1b shown in FIG. 18 differs from the projector 1a shown in FIG. 17 in that the projector 1b includes a position/size changer 47. The projector 1b will be described below primarily on the difference from the projector 1a.

The position/size changer 47 is achieved by causing the controller 108 to read and execute the program stored in the storage 107.

When the operation receiver 101 receives the position change instruction, the position/size changer 47 changes the position of the projection image based on the position change instruction. In Variation 3, the operation receiver 101 is an example of a second receiver.

Figure 19:
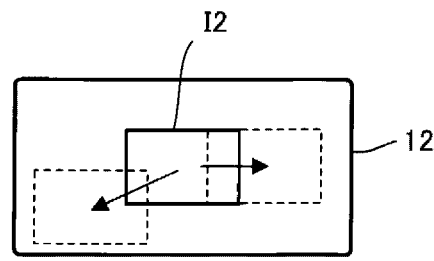
FIG. 19 shows an example of movement of the projection position detection pattern.

In the case where the projection position detection pattern I2 has been reduced in the electronic tele-widening, the projection position detection pattern I2 is movable on the liquid crystal light valve 12, as shown in FIG. 19 by way of example.

When the operation receiver 101 receives the position change instruction in the situation in which the projection section 104 projects the projection position detection pattern I2, the position/size changer 47 first moves the position of the projection position detection pattern I2 on the liquid crystal light valve 12 in accordance with the position change instruction. The position/size changer 47 subsequently changes the sizes of the dots in accordance with the positions to which the dots have moved as described above by using the relationship information described above.

For example, when the position change instruction instructs movement of the position of the projection position detection pattern I2 on the projection surface 5a in the direction away from the imaging section 106, the size of the dot I2b after the position change is greater than the size of the dot I2b before the position change and the size of the dot I2a after the position change is greater than the size of the dot I2a before the position change.

According to Variation 3, the situation in which the change in position of the projection position detection pattern I2 makes it difficult to detect the dots I2a to I2d can be avoided.

Variation 4

In the first embodiment and Variations 1 to 3, the projection controller 41, when it carries out step S5 after step S17, may adjust the positions and sizes of the dots I2a to I2d used in step S5 based on the positions of the objects 7 detected in step S13.

For example, the projection controller 41 adjusts the positions of the dots I2a to I2d in a generation image of the projection position detection pattern I2 in such a way that the dots I2a and I2c are disposed on the straight line that couples the first object 7a and the third object 7c detected in step S13 to each other and the dots I2b and I2d are disposed on the straight line that couples the second object 7b and the fourth object 7d detected in step S13 to each other. The projection controller 41 subsequently increases the size of each of the dots I2a to I2d in the generation image of the projection position detection pattern I2 by a greater amount when the dot is separate from the upper end I22 by a longer distance.

The projection controller 41 preferably adjusts the sizes of the dots I2a to I2d in the generation image of the projection position detection pattern I2 in such a way that the dots I2a to I2d in the dot captured image P1 have the same size or substantially the same size.

Variation 5

Figure 20:
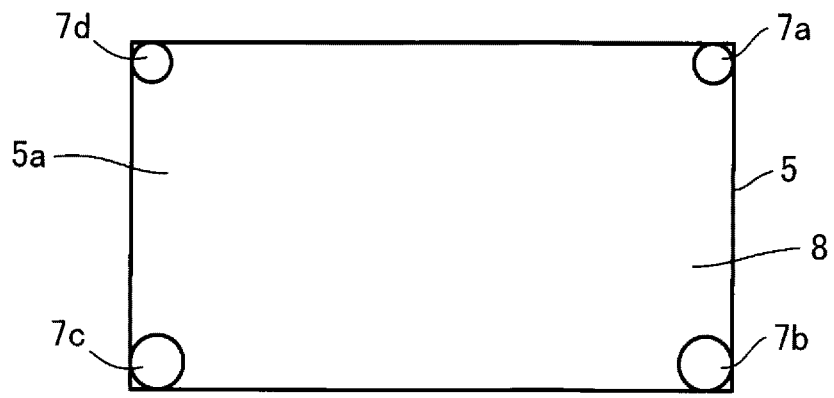
FIG. 20 shows another example of Variation 3.

In the first embodiment and Variations 1 to 4, the size of the second object 7b may be greater than the size of the first object 7a, and the size of the third object 7c may be greater than the size of the fourth object 7d, as shown in FIG. 20 by way of example. Further, the size of the first object 7a may be equal to the size of the fourth object 7d, and the size of the second object 7b may be equal to the size of the third object 7c.

Figure 21:
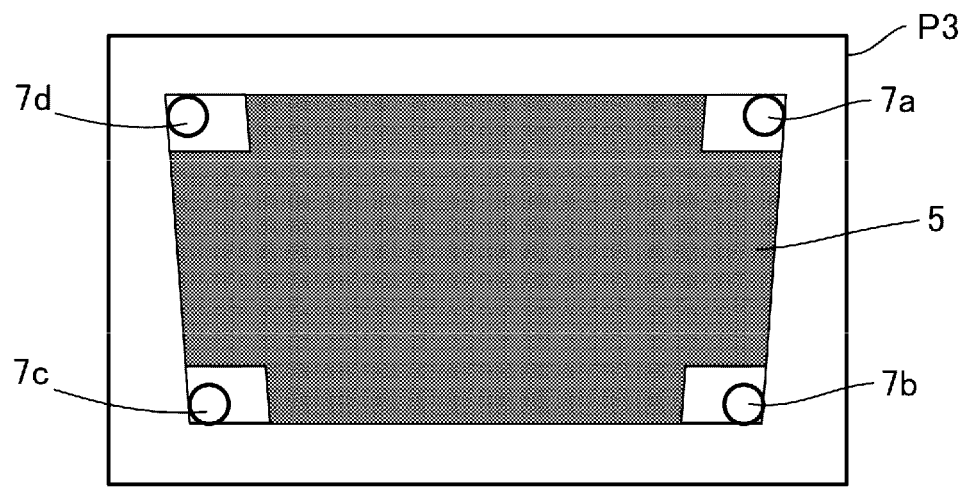
FIG. 21 shows an example of an object captured image.

In this case, the difference in size among the first object 7a, the second object 7b, the third object 7c, and the fourth object 7d in an object captured image P3 shown in FIG. 21 by way of example is smaller than the difference in size among the first object 7a, the second object 7b, the third object 7c, and the fourth object 7d on the projection surface 5a shown in FIG. 20 by way of example.

According to Variation 5, the first object 7a, the second object 7b, the third object 7c, and the fourth object 7d are readily detected from the object captured image P3, as compared with the case where the first object 7a, the second object 7b, the third object 7c, and the fourth object 7d on the projection surface 5a have the same size.

The second object 7b larger than the first object 7a may be used and the third object 7c larger than the fourth object 7d may be used so that the first object 7a, the second object 7b, the third object 7c, and the fourth object 7d have the same size in the object captured image P3. In this case, the first object 7a, the second object 7b, the third object 7c, and the fourth object 7d are each more readily detected from the object captured image P3.

The first object 7a, the second object 7b, the third object 7c, and the fourth object 7d may not have the same size in the object captured image P3. For example, the first object 7a, the second object 7b, the third object 7c, and the fourth object 7d may have substantially the same size.

The situation in which the first object 7a, the second object 7b, the third object 7c, and the fourth object 7d have substantially the same size in the object captured image P means, for example, that the difference in size between the largest object and the smallest object out of the first object 7a, the second object 7b, the third object 7c, and the fourth object 7d in the object captured image P3 falls within 5% of the diameter of the smallest object. The situation in which the objects have substantially the same size may instead mean that the difference described above falls within 10% of the diameter of the smallest object described above. The definition described above is changeable as appropriate.

Variation 6

In the first embodiment and Variations 1 to 5, the projection section 104 may project the four dots I2a to I2d for each of the objects 7 in the vicinity of the position the object 7, and the coordinate adjuster 44 may produce the projection conversion matrix by using the dots I2a to I2d in the vicinity of the position of the object 7. In this case, the effect of the distortion produced by the lens in the imaging section 106 can be locally reduced. Also in this case, the number of dots projected in the vicinity of the position of each of the objects 7 may be greater than 4.

Figure 22:
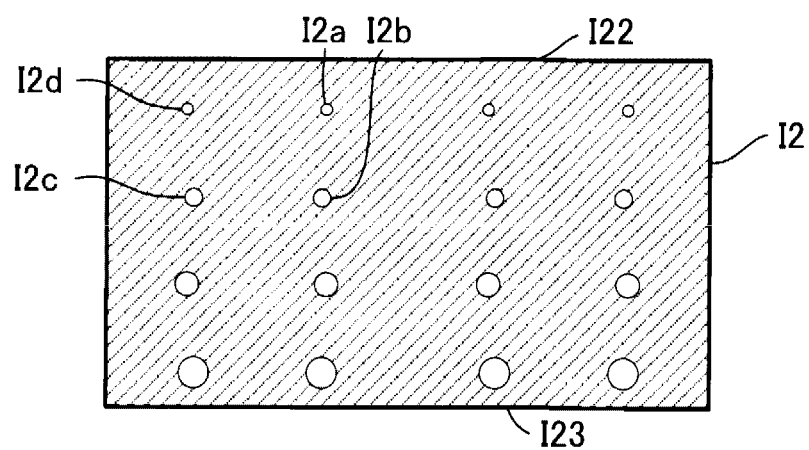
FIG. 22 shows an example of Variation 6.

Also in this case, the projection position detection pattern I2 is so set that the size of each of the dots I2a to I2d in a generation image of the projection position detection pattern I2 increases by a greater amount when the dot is separate from the upper end I22 by a longer distance, as shown in FIG. 22 by way of example.

Figure 23:
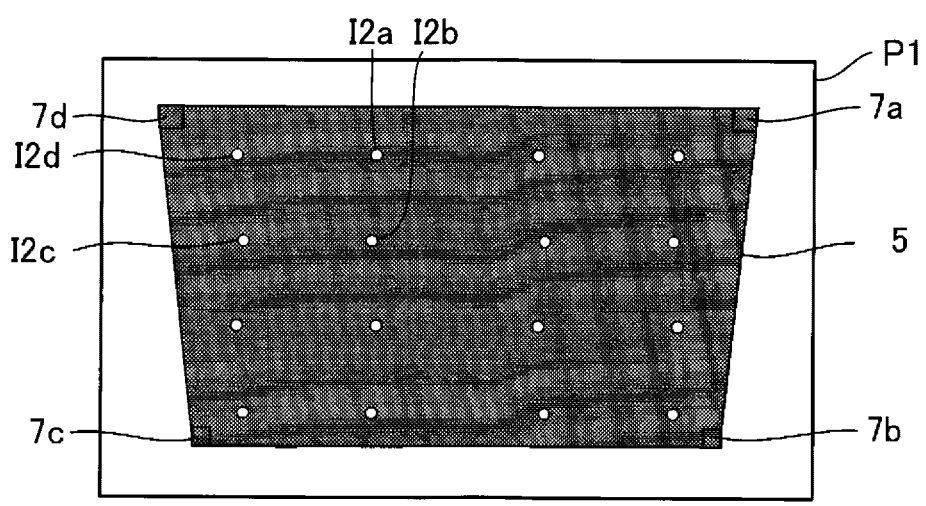
FIG. 23 shows an example of a dot captured image in Variation 6.

For example, the dots I2a to I2d are so set in the projection position detection pattern I2 that the dots I2a to I2d have the same size or substantially the same size in the dot captured image P1, as shown in FIG. 23 by way of example.

Variation 7

In the first embodiment and Variations 1 to 6, the objects 7 are each not limited to a recursive reflection member. The objects 7 only need to have an optical reflection characteristic different from that of the projection surface 5a. For example, the objects 7 may be made of a material having reflectance higher than that of the projection surface 5a or may be made of a material that absorbs light incident thereon by a greater amount than the material of the projection surface 5a.

The object may still instead be formed of a self-luminous light emitting member. An example of the light emitting member may include a member including a light source. The light source is, for example, an LED or a lamp.

In this case, the object detector 45 uses, for example, the difference between object captured image data generated when the objects 7 emit light and object captured image data generated when the objects 7 emit no light to detect the positions of the objects 7. Projection images projected from the projection section 104 when the two sets of object captured image data are generated may be the same projection image.

In the case where the objects 7 emit light, and when the projection section 104 projects a projection image having undergone the trapezoidal distortion correction on the projection surface 5a, as shown in FIG. 12, the imaging controller 42 may cause the imaging section 106 to capture an image of the projection image. The imaging section 106 generates captured image data for object detection by capturing an image of the projection surface 5a on which the post-trapezoidal-distortion-correction projection image P having undergone the trapezoidal distortion correction has been projected.

The object detector 45 may detect the objects 7 based on the captured image data for object detection. In this case, since the objects 7 emit light, the object detector 45 detects the objects 7 based on the luminance of the captured image indicated by the captured image data for object detection.

The projection controller 41 may carry out step S9 when the positions of the objects 7 detected by using the captured image data for object detection specify the projection area 8 off which part of the post-trapezoidal-distortion-correction projection image P extends. The projection controller 41 may stop projecting the post-trapezoidal-distortion-correction projection image P when the positions of the objects 7 detected by using the captured image data for object detection specify the projection area 8 off which part of the projection image P extends.

In this case, the process of detecting the objects 7 by projecting the object detection pattern I3 can be omitted. It is therefore unnecessary to store or generate the object detection pattern I3.

Variation 8

In the first embodiment and Variations 1 to 7, the recursive reflection member used as each of the objects 7 may have a recursive reflection characteristic for visible light or a recursive reflection characteristic for nonvisible light, such as infrared light.

In the case where a recursive reflection member having a recursive reflection characteristic for visible light is used each of the objects 7, the object detection pattern I3 is formed by light containing visible light.

In the case where a recursive reflection member having a recursive reflection characteristic for nonvisible light is used each of the objects 7, the object detection pattern I3 is formed by light containing nonvisible light.

Variation 9

In the first embodiment and Variations 1 to 8, the objects 7 may differ from the projection surface 5a in terms of optical reflection characteristic. Therefore, for example, when the projection surface 5a is a white surface, the objects 7 may each be a member characterized in that it absorbs light by a greater amount than the projection surface 5a, for example, a black member. In this case, the object detector 45 detects areas of the object captured image that are the areas where the luminance is lower than that of the portion around the areas as the object areas where the objects 7 are present.

The objects 7 can be readily detected on a variety of projection surfaces 5a by employing a configuration in which the reflection characteristic of the objects 7 is changeable, for example, by switching the reflection surface itself of each of the objects 7 to another reflection surface or an optical filter provided on the reflection surface of each of the objects 7 is switched to another optical filter. In this case, a configuration in which the objects 7 each include a receiver that receives a control signal over wireless communication and a changer that changes the reflection characteristic based on the control signal allows the user to change the reflection characteristic via operation of the remote control. Instead, the objects 7 may each automatically switch the reflection characteristic thereof by causing the projector 1 to transmit a control signal based on an image captured by the imaging section 106 to the object 7.

Variation 10

In the first embodiment and Variations 1 to 9, the positions of the four objects 7 are not limited to the four corners of the projection surface 5a and is changeable as appropriate. For example, the positions of the four objects 7 may be positions shifted inward from the corners of the projection surface 5a.

Variation 11

In the first embodiment and Variations 1 to 10, the number of objects 7 is not limited to four and only needs to be two or more.

Variation 12

In the first embodiment and Variations 1 to 11, the first message M1 and the second message M2 may be entirely or partially omitted in the guide image I1. Further, the second area I12 may be omitted along with the second message M2 in the guide image I1.

Variation 13

In the first embodiment and Variations 1 to 12, the range of the first area I11 may be formed of movement allowing ranges over which the four corners of a projection image are movable when the distortion corrector 102b performs the trapezoidal distortion correction or may be formed of ranges contained in the movement allowing ranges.

Variation 14

In the first embodiment and Variations 1 to 13, when the projection position detection pattern I2 is formed by nonvisible light, such as infrared light, the second area I12 and the second message M2 are omitted in the guide image I1. In the case where the projection position detection pattern I2 is formed by nonvisible light, such as infrared light, the user does not recognize the projection position detection pattern I2, whereby step S5 can be so carried out that the user does not notice that step S5 is being carried out.

In the case where the object detection pattern I3 is formed by nonvisible light, such as infrared light, the user does not recognize the object detection pattern I3, whereby step S11 can be so carried out that the user does not notice that step S11 is being carried out.

Variation 15

In the first embodiment and Variations 1 to 14, a movable surface, such as an elevator door, may be used as the projection surface 5a. In this case, for example, opening the elevator door where the objects 7 are located can darken a projection image or stop projecting a projection image.

Variation 16

In the first embodiment and Variations 1 to 15, the objects 7 may be fixed to the projection surface 5a with the aid of magnetic force or via an adhesive member. The method for fixing the objects 7 to the projection surface 5a is changeable as appropriate.

Variation 17

In the first embodiment and Variations 1 to 16, when the storage 107 stores image data, the image combiner 102a may use the image data stored in the storage 107 in place of received image data.

Variation 18

In the first embodiment and Variations 1 to 17, elements achieved by a program executed by the controller 108 may be entirely or partially achieved by hardware formed of an electronic circuit or by cooperation of software and hardware. The electronic circuit is, for example, an FPGA (field programmable gate array) or an ASIC (application specific IC).

Variation 19

In the first embodiment and Variations 1 to 18, the projection section 104 uses the liquid crystal light valves as a light modulator, and the light modulator is not necessarily formed of the liquid crystal light valves and is changeable as appropriate. For example, the light modulator may be formed of three reflective liquid crystal panels. The light modulator may instead be formed, for example, of the combination of one liquid crystal panel and one color wheel, three digital mirror devices, or the combination of one digital mirror device and one color wheel. In the case where only one liquid crystal panel or digital mirror device is used as the light modulator, no member corresponding to the color separation system or the light combining system is required. Further, a configuration including no liquid crystal panel or a digital mirror device but capable of modulating light outputted from a light source can be employed as the light modulator.

Variation 20

In the first embodiment and Variations 1 to 19, step S9 may be omitted.

Variation 21

In a case where the dots I2a to I2d shown in the projection position detection pattern I2 have the same luminance, and the exposure value set in the imaging section 106 is fixed, a dot located on the projection surface 5a has lower brightness in the dot captured image P1 when the dot is separate from the imaging section 106 by a longer distance.

In the case where the dots I2a to I2d shown in the projection position detection pattern I2 have the same luminance, and the exposure value set in the imaging section 106 is fixed, a dot in the dot captured image P1 captured via the fisheye lens 106a has lower brightness due to lens shading produced by the fisheye lens 106a when the dot is separate from the position of the center of the fisheye lens 106a.

Therefore, for example, the darkest dot out of the dots I2a to I2d in the dot captured image P1 is likely to be affected by noise produced by the imaging section 106, possibly resulting in a decrease in precision of the detection of the center of gravity of the dot or failure of the detection of the dot.

To solve the problem, brightness adjusted patterns may be successively projected on a dot or object basis, or an image of a dot or an object may be captured to detect the center of gravity thereof while the exposure value set in the imaging section 106 is adjusted. For example, a brighter pattern is projected for a dot separate from the imaging section 106 by a longer distance, or a larger exposure value is set in the imaging section 106 to capture an image of a dot separate from the imaging section 106 by a longer distance.

In this case, a captured image is generated at an optimum exposure value on a dot or object basis, whereby the dot or object is stably detected.

Further, since dots or objects are sequentially detected, failure of the detection still allows the user to visually grasp which dot or object has been unsuccessfully detected, whereby the user can take some measures by examining the portion around the dot or object. For example, when part of the dots are irradiated with strong environmental light, a case where the dots are projected, for example, on a dirty wall, or a case where no object 7 is present in the white rectangle of the guide image I1, the user can take measures against any of the causes described above.

What is claimed is:

1. A method for controlling a projector including an imaging section, the method comprising:
    projecting a projection image representing a first mark and a second mark on a projection surface;
    generating captured image data representing a captured image by causing the imaging section to capture an image of the projection image projected on the projection surface; and
    detecting a position of the first mark and a position of the second mark based on the captured image data,
    wherein a first distance between the first mark projected on the projection surface and the imaging section is longer than a second distance between the second mark projected on the projection surface and the imaging section,
    wherein a size of the first mark is greater than a size of the second mark,
    wherein the method further comprises:
        receiving a size change instruction that instructs a change in a size of the projection image; and
        changing the size of the projection image, the size of the first mark, and the size of the second mark based on the size change instruction, and
    wherein a degree of the change in the size of the first mark based on the size change instruction and a degree of the change in the size of the second mark based on the size change instruction differ from a degree of the change in the size of the projection image based on the size change instruction.

2. The method for controlling a projector according to claim 1,
    wherein the first mark and the second mark each represent a dot or a polygon.

3. The method for controlling a projector according to claim 1,
    wherein the imaging section captures an image via a fisheye lens, and
    a distance between a position of a center of the fisheye lens in the captured image and the first mark in the captured image is longer than or equal to a distance between the position of the center of the fisheye lens in the captured image and the second mark in the captured image.

4. The method for controlling a projector according to claim 1, further comprising:
    receiving a size change instruction that instructs a change in a size of the projection image; and
    changing the size of the projection image based on the size change instruction with the size of the first mark and the size of the second mark maintained.

5. The method for controlling a projector according to claim 1, further comprising:
    receiving a position change instruction that instructs a change in a position of the projection image, and
    changing the position of the projection image, the size of the first mark, and the size of the second mark based on the position change instruction.

6. The method for controlling a projector according to claim 5,
    wherein when the position change instruction is an instruction that instructs movement of the position of the projection image in a direction away from the imaging section, the size of the first mark after the change is so increased as to be greater than the size of the first mark before the change.

7. A projector comprising:
    a projection section configured to project a projection image representing a first mark and a second mark on a projection surface;
    an imaging section configured to generate captured image data representing a captured image by capturing an image of the projection image projected on the projection surface; and
    one or more processors programmed to detect a position of the first mark and a position of the second mark based on the captured image data,
    wherein a first distance between the first mark projected on the projection surface and the imaging section is longer than a second distance between the second mark projected on the projection surface and the imaging section,
    wherein a size of the first mark is greater than a size of the second mark,
    wherein the one or more processors are programmed to
    receive a position change instruction that instructs a change in a position of the projection image, and
    change the position of the projection image, the size of the first mark, and the size of the second mark based on the position change instruction, and
    wherein when the position change instruction is an instruction that instructs movement of the position of the projection image in a direction away from the imaging section, the one or more processors are programmed to set the size of the first mark after the change so as to be greater than the size of the first mark before the change.

8. The projector according to claim 7,
    wherein the first mark and the second mark each represent a dot or a polygon.

9. The projector according to claim 7,
wherein the imaging section is configured to capture an image via a fisheye lens, and
a distance between a position of a center of the fisheye lens in the captured image and the first mark in the captured image is longer than or equal to a distance between the position of the center of the fisheye lens in the captured image and the second mark in the captured image.

10. The projector according to claim 7,
wherein the one or more processors are programmed to
receive a size change instruction that instructs a change in a size of the projection image; and
change the size of the projection image based on the size change instruction with the size of the first mark and the size of the second mark maintained.

11. The projector according to claim 7, wherein the one or more processors are programmed to
receive a size change instruction that instructs a change in a size of the projection image; and
change the size of the projection image, the size of the first mark, and the size of the second mark based on the size change instruction,
wherein a degree of the change in the size of the first mark based on the size change instruction and a degree of the change in the size of the second mark based on the size change instruction differ from a degree of the change in the size of the projection image based on the size change instruction.

12. A method for controlling a projector including an imaging section, the method comprising:
projecting a projection image representing a first mark and a second mark on a projection surface;
generating captured image data representing a captured image by causing the imaging section to capture an image of the projection image projected on the projection surface via a fisheye lens; and
detecting a position of the first mark and a position of the second mark based on the captured image data,
wherein a distance between a position of a center of the fisheye lens in the captured image and the first mark in the captured image is longer than or equal to a distance between the position of the center of the fisheye lens in the captured image and the second mark in the captured image, and
a size of the first mark is greater than a size of the second mark in the captured image.

13. A projector comprising:
a projection section configured to project a projection image representing a first mark and a second mark on a projection surface;
an imaging section configured to generate captured image data representing a captured image by capturing an image of the projection image projected on the projection surface via a fisheye lens; and
one or more processors programmed to detect a position of the first mark and a position of the second mark based on the captured image data,
wherein a distance between a position of a center of the fisheye lens in the captured image and the first mark in the captured image is longer than or equal to a distance between the position of the center of the fisheye lens in the captured image and the second mark in the captured image, and
a size of the first mark is greater than a size of the second mark in the captured image.

\* \* \* \* \*